United States Patent
Endo et al.

(10) Patent No.: US 9,688,302 B2
(45) Date of Patent: Jun. 27, 2017

(54) IN-VEHICLE ELECTRONIC CONTROL APPARATUS

(71) Applicant: NSK LTD., Shinagawa-ku, Tokyo (JP)

(72) Inventors: Shuji Endo, Tokyo (JP); Masashi Ueno, Tokyo (JP); Kenichi Okamoto, Tokyo (JP); Shin Kumagai, Tokyo (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/349,522

(22) PCT Filed: Jun. 6, 2013

(86) PCT No.: PCT/JP2013/003587
§ 371 (c)(1),
(2) Date: Apr. 3, 2014

(87) PCT Pub. No.: WO2014/041726
PCT Pub. Date: Mar. 20, 2014

(65) Prior Publication Data
US 2015/0175193 A1 Jun. 25, 2015

(30) Foreign Application Priority Data
Sep. 11, 2012 (JP) .................................. 2012-199619

(51) Int. Cl.
*B62D 5/04* (2006.01)
(52) U.S. Cl.
CPC ......... *B62D 5/0487* (2013.01); *B62D 5/0481* (2013.01)
(58) Field of Classification Search
USPC ...................................................... 701/29.2
See application file for complete search history.

(56) References Cited

U.S. PATENT DOCUMENTS

| | | | | |
|---|---|---|---|---|
| 4,884,217 A | * | 11/1989 | Skeirik ............... | G05B 13/028 706/11 |
| 5,430,642 A | * | 7/1995 | Nakajima ............... | B21B 37/28 700/149 |
| 5,805,797 A | * | 9/1998 | Sato ........................ | B61L 3/008 714/48 |
| 5,897,596 A | * | 4/1999 | Kabune .................. | B60T 8/885 303/122.04 |

(Continued)

FOREIGN PATENT DOCUMENTS

EP 1 524 501 A1 4/2005
EP 1 803 629 A1 7/2007

(Continued)

OTHER PUBLICATIONS

International Search Report dated Sep. 10, 2013 with English translation (three (3) pages).

(Continued)

*Primary Examiner* — Jean-Paul Cass
(74) *Attorney, Agent, or Firm* — Crowell & Moring LLP

(57) ABSTRACT

There is provided an in-vehicle electronic control apparatus suitable for enhancing a robust characteristic of a failure diagnosis process performed for a functional part having a function relating to a drive-control of an actuator. A functional part (120) relating to the drive-control of an electric motor (12) includes a main functional part (120a) and an alternative functional part (120b) that is an alternative of the main functional part.

6 Claims, 24 Drawing Sheets

(56) References Cited

U.S. PATENT DOCUMENTS

| | | | |
|---|---|---|---|
| 6,029,767 A | 2/2000 | Kifuku | |
| 8,423,229 B2* | 4/2013 | Suetsugu | G01P 21/00 701/29.2 |
| 2002/0022914 A1* | 2/2002 | Kawada | B62D 5/0493 701/41 |
| 2002/0189328 A1 | 12/2002 | Saito et al. | |
| 2005/0162292 A1* | 7/2005 | Kanekawa | B60T 8/885 341/111 |
| 2005/0234631 A1* | 10/2005 | Nomura | F02D 41/003 701/102 |
| 2007/0230647 A1* | 10/2007 | Pourbigharaz | H04L 7/0083 375/371 |
| 2007/0290648 A1* | 12/2007 | Shimojo | F02D 13/02 318/650 |
| 2010/0250061 A1* | 9/2010 | Toyofuku | G07C 5/085 701/33.4 |
| 2012/0268995 A1* | 10/2012 | Sugimoto | G11C 16/349 365/185.11 |

FOREIGN PATENT DOCUMENTS

| | | |
|---|---|---|
| EP | 2 216 626 A1 | 8/2010 |
| EP | 2 557 502 A1 | 2/2013 |
| JP | 11-139224 A | 5/1999 |
| JP | 11-147479 A | 6/1999 |
| JP | 2005-88676 A | 4/2005 |
| JP | 2007-118823 A | 5/2007 |
| JP | 2009-161156 A | 7/2009 |
| JP | 2010-29030 A | 2/2010 |
| JP | 2012-45990 A | 3/2012 |

OTHER PUBLICATIONS

Japanese-language Written Opinion (PCT/ISA/237) dated Sep. 10, 2013 with English translation (six (6) pages).

Japanese Office Action issued in counterpart Japanese Application No. 2012-199619 dated Dec. 1, 2015 with English-language translation (six (6) pages).

Extended European Search Report mailed Apr. 18, 2016, in connection with European Application EP 13 83 7200 (nine (9) pages).

* cited by examiner

IN-VEHICLE ELECTRONIC CONTROL APPARATUS

TECHNICAL FIELD

The present invention relates to an in-vehicle electronic control apparatus including an actuator that generates a drive force to be given to an operation mechanism of an in-vehicle apparatus, and an actuator control unit that drive-controls the actuator.

BACKGROUND ART

In the related art, an electric power steering apparatus that applies a steering auxiliary power (i.e., assist torque) from an electric motor to an in-vehicle steering mechanism has been proposed.

For example, PTL 1 discloses a technique in which two systems of torque sensors are provided in an electric power steering apparatus, a torque sensor where an abnormality occurs, among the two systems of torque sensors, can be identified, and in addition, a steering assistance can be stably continued based on a detection value of a torque sensor where the abnormality is not detected.

Further, in the related art disclosed in PTL 1, a failure monitoring part sets deviations (51 Tr1-Trx|, |Tr2-Trx|) between an estimated torque Trx calculated by an estimation torque computing part and steering torques Tr1 and Tr2 detected by the torque sensors as reliability levels. Then, a target assist torque Tas* is set by using a steering torque detected by the torque sensor having a lower reliability level.

CITATION LIST

Patent Literature

PTL 1: JP 2012-45990 A

SUMMARY OF INVENTION

Technical Problem

However, in the above-mentioned related art, for example, when an operation guaranteed range of the failure monitoring part that detects the abnormality of the torque sensor is narrower than an operation guaranteed range of the torque sensor, the failure monitoring part becomes abnormal prior to the torque sensor, and thus, the failure of the torque sensor may not be detected properly. In this case, for example, even though both of the torque sensors are in a failure condition, such failures are not detected, and thus, a control by using abnormal values may be performed.

In order to solve the above problems, an object of the present invention is to provide an in-vehicle electronic control apparatus suitable for enhancing robustness of a failure diagnosis process performed for a functional part having a function relating to drive-control of an actuator.

Solution to Problem

According to a first aspect of the present invention, there is provided An in-vehicle electronic control apparatus comprising: an actuator configured to generate a drive force to be given to an operation mechanism of an in-vehicle apparatus; an actuator control unit configured to drive-control the actuator; a main functional part having a first function that is a function relating to the drive-control of the actuator; an alternative functional part having a second function that is an alternative function of the first function; and a failure diagnosis part configured to diagnose a failure of the main functional part, wherein the actuator control unit includes a first control process that is a control process based on an output value of the main functional part and a second control process that is a control process based on an output value of the alternative functional part, performs the first control process to drive-control the actuator when it is determined that the main functional part is normal based on a diagnosis result of the failure diagnosis part, and performs the second control process to drive-control the actuator when it is determined that the main functional part has a failure, and the failure diagnosis part is configured to capable of diagnosing the main functional part in an operation guaranteed range wider than an operation guaranteed range of the main functional part.

According to this configuration, it is possible to diagnose the failure of the main functional part by the failure diagnosis part that has the operation guaranteed range wider than the operation guaranteed range of the main functional part. Thus, even in an operational environment where the operation of the main functional part is abnormal or in an operational environment where the main functional part is damaged, when the operational environment is an environment within a range where the failure diagnosis part operates normally, it is possible to accurately diagnose the failure of the main functional part. In addition, even though the main functional part is diagnosed as a failure, it is possible to switch the first control process based on the output value of the main functional part to the second control process based on the output value of the alternative functional part. Thus, it is possible to relax requirements for error detection in a monitoring logic of the failure diagnosis part. That is, even though the error detection occurs due to a low cost component with a wide range of variation, it is possible to continue the operation by the alternative function.

Further, according to a second aspect of the present invention, in the in-vehicle electronic control apparatus according to the first aspect of the present invention, the failure diagnosis part may diagnose a failure of the alternative functional part in addition to the main functional part, and the actuator control unit may determine that the main functional part has a failure based on the diagnosis result of the failure diagnosis part, may carry out the second control process when it is determined that the alternative functional part is normal, and at least may stop the first control process and the second control process when it is determined that both of the main functional part and the alternative functional part have failures.

According to this configuration, it is also possible to diagnose the failure of the alternative functional part by the failure diagnosis part. Further, when the failure diagnosis part determines that the main functional part is diagnosed as a failure and the alternative functional part is diagnosed as normal by the failure diagnosis part, the actuator control unit can switch the first control process to the second control process. Further, when the failure diagnosis part determines that both of the main functional part and the alternative functional part have a failure, the actuator control unit can stop at least the first control process and the second control process.

Thus, when the alternative functional part is normal, the failure diagnosis part can continue the monitoring of the alternative functional part while carrying out the second control process. Further, when both of the functional part and the alternative functional part have a failure, the failure diagnosis part can stop at least a control process that uses an output value of the functional part that has a failure.

According to a third aspect of the present invention, the in-vehicle electronic control apparatus according to the first or second aspect of the present invention may further include: a failure monitoring part configured to monitor an occurrence of a failure of the failure diagnosis part; and an operation stop processing part configured to carry out a process of stopping an operation of the in-vehicle electronic control apparatus when it is determined that the failure occurs in the failure diagnosis part based on a monitoring result of the failure monitoring part, wherein the failure monitoring part may be configured to be capable of diagnosing the failure diagnosis part in an operation guaranteed range wider than an operation guaranteed range of the failure diagnosis part.

According to this configuration, it is possible to detect the failure of the failure diagnosis part by the failure monitoring part. Further, when it is determined that the failure occurs in the failure diagnosis part, it is possible to carry out the process of stopping the operation of the in-vehicle electronic control apparatus by the operation stop processing part. Thus, when the failure diagnosis part is abnormal and it is thus not possible to accurately diagnose the failures of the main functional part and the alternative functional part, it is possible to stop the operation of the in-vehicle electronic control apparatus. That is, when the failure diagnosis part having the operation guaranteed range wider than those of the main functional part and the alternative functional part is abnormal, since there is a high probability that the main functional part and the alternative functional part also have a failure, in this case, the process of stopping the operation of the in-vehicle electronic control apparatus is carried out in view of safety.

Further, it is possible to monitor the occurrence of the failure of the failure diagnosis part by the failure monitoring part having the operation guaranteed range wider than the operation guaranteed range of the failure diagnosis part. Thus, even in an operational environment where the operation of the failure diagnosis part is abnormal or in an operational environment where the failure diagnosis part is damaged, when the operational environment is an environment within a range where the failure monitoring part operates normally, it is possible to accurately diagnose the failure of the failure diagnosis part.

According to a fourth aspect of the present invention, the in-vehicle electronic control apparatus according to any one of the first to third aspect of the present invention may further include: a plurality of types of sensors configured to detect physical values, respectively, relating to the drive-control of the actuator, wherein the main functional part may have a function, as the first function, of computing a value relating to the drive-control by using a detection value of a predetermined type of sensor of the plurality of types of sensors, and the alternative functional part may have a function, as the second function, of computing a value relating to the drive-control by using a detection value of a predetermined type of sensor different from that of the main functional part among the plurality of types of sensors.

According to this configuration, since the physical values used in the main functional part and the alternative functional part are different physical values, when the sensors that detect the physical values fail or the like, it is possible to prevent both of the main functional part and the alternative functional part from simultaneously entering a non-operable state (an abnormal state or a failure state).

According to a fifth aspect of the present invention, in the in-vehicle electronic control apparatus according to anyone of the first to fourth aspects of the present invention, the failure diagnosis part may determine whether or not the physical value is a value in a failure detection range based on a failure detection threshold value that is a threshold value for determining whether or not the physical value used in a failure diagnosis target is a value within the predetermined failure detection range and based on the physical value, may diagnose that the diagnosis target has a failure when it is determined that the value falls within the failure detection range, and may diagnose that the diagnosis target is normal when it is determined that the value is outside the failure detection range, and the in-vehicle electronic control apparatus may further include: an abnormality determining part configured to determine whether or not the physical value is an abnormal value based on an abnormality determination threshold value that is a threshold value for determining whether or not the physical value is the abnormal value and based on the physical value, the abnormality determination threshold value falling within a failure detection margin that is in a predetermined numerical value range between a predetermined normal value range for the physical value and the failure detection threshold value for suppressing an error in detection of the failure; and an abnormal behavior reducing part configured to reduce an abnormal behavior of the operation mechanism generated by the abnormal value when it is determined that the physical value is the abnormal value based on a determination result of the abnormality determining part.

According to this configuration, by determining whether or not the physical value is a value in the failure detection range based on the physical value and the failure detection threshold value by the failure diagnosis part, it is possible to diagnose the failure of the diagnosis target. Further, it is possible to determine whether or not the physical value is the abnormal value based on the physical value and the abnormality determination threshold value by the abnormality determining part. Furthermore, when it is determined that the physical value is the abnormal value based on the determination result of the abnormality determining part, it is possible to reduce the abnormal behavior that is the behavior generated by the abnormal value by the abnormal behavior reducing part.

According to a sixth aspect of the present invention, in the in-vehicle electronic control apparatus according to the fifth aspect of the present invention, the abnormal behavior reducing part may correct the physical value used in the failure diagnosis target before the physical value is input to the diagnosis target to reduce the abnormal behavior.

According to this configuration, it is possible to correct the physical value before the physical value used in the main functional part or the alternative functional part is input to the failure diagnosis target, by the abnormal behavior reducing part, to reduce the abnormal behavior.

According to a seventh aspect of the present invention, in the in-vehicle electronic control apparatus according to the sixth aspect of the present invention, the actuator control unit may include a processor and an A/D converter configured to convert an analog input value into a digital value to input the converted digital value to the processor, at least one of the first function and the second function may be realized by carrying out a program on the processor, the physical value may include a power supply voltage supplied to the processor and used as a reference voltage of the A/D converter, and the abnormal behavior detecting part may correct an output value of the A/D converter before the output value is input to the failure diagnosis target that uses the output value to reduce the abnormal behavior, when it is determined that the power supply voltage is an abnormal value.

According to this configuration, it is possible to determine whether or not the power supply voltage is in the failure detection range based on the power supply voltage and the failure detection threshold value supplied to the processor, by the failure diagnosis part. Further, it is possible to determine whether or not the power supply voltage is the abnormal value based on the power supply voltage and the failure detection threshold value supplied to the processor, by the abnormality determining part. Furthermore, when it is determined that the power supply voltage is the abnormal value, it is possible to correct the output value of the A/D converter that uses the power supply voltage supplied to the processor as the reference voltage before the output value is input to the main functional part or the alternative functional part that uses the output value, by the abnormal behavior reducing part, to reduce the abnormal behavior.

According to an eighth aspect of the present invention, in the in-vehicle electronic control apparatus according to at least any one of the fifth to seventh aspect of the present invention, the abnormal behavior reducing part may correct an output value of the failure diagnosis target to reduce the abnormal behavior.

According to this configuration, it is possible to correct the output value of the main functional part or the alternative functional part by the abnormal behavior reducing part to reduce the abnormal behavior.

According to a ninth aspect of the present invention, in the in-vehicle electronic control apparatus according to the eighth aspect of the present invention, the actuator control unit may include a processor, at least one of the first function and the second function is a phase characteristic function that is a function having a phase advance characteristic or a phase delay characteristic in which a sampling frequency is determined by an operation clock signal of the processor, the physical value includes the operation clock signal, and the abnormal behavior reducing part may correct an output value of a functional part that has the phase characteristic function used in the actuator control unit to reduce the abnormal behavior, when it is determined that a frequency of the operation clock signal is an abnormal value.

According to this configuration, it is possible to determine whether or not the frequency is a value in the failure detection range based on the frequency of the operation clock signal of the processor and the failure detection threshold value set with respect to the frequency, by the failure diagnosis part. Further, it is possible to determine whether or not the frequency is the abnormal value based on the frequency of the operation clock signal of the processor and the abnormality determination threshold value set with respect to the frequency, by the abnormality determining part. Furthermore, when it is determined that the frequency is the abnormal value, it is possible to correct the output value of the functional part having the phase characteristic function by the abnormal behavior reducing part to reduce the abnormal behavior.

According to a tenth aspect of the present invention, in the in-vehicle electronic control apparatus according to the ninth aspect of the present invention, the failure detection threshold value corresponding to the frequency of the operation clock signal may include a failure detection lower limit threshold value that is a threshold value on a side where the frequency is decreased, the abnormality determination threshold value corresponding to the frequency of the operation clock signal includes an abnormality determination lower limit threshold value that is a threshold value on the side where the frequency is decreased, the failure diagnosis part may determine whether or not the frequency is a value in the failure detection range based on the frequency and the failure detection lower limit threshold value with respect to a functional part that has the phase characteristic function of the phase advance characteristic, the abnormality determining part may determine whether or not the physical value is an abnormal value based on the frequency and the abnormality determination lower limit threshold value with respect to the functional part that has the phase characteristic function of the phase advance characteristic, and the abnormality behavior reducing part may perform a correction of reducing an output value of the functional part that has the phase characteristic function of the phase advance characteristic used in the actuator control unit by a predetermined value with respect to the functional part that has the phase characteristic function of the phase advance characteristic, when it is determined that the frequency of the operation clock signal is an abnormal value that exceeds the abnormality determination lower limit threshold value on the side where the frequency is decreased.

According to this configuration, it is possible to determine whether or not the frequency is a value in the failure range on the side where the frequency is decreased based on the frequency of the operation clock signal of the processor and the failure detection lower limit threshold value, by the failure diagnosis part. Further, it is possible to determine whether or not the frequency is the abnormal value on the side where the frequency is decreased based on the frequency of the operation clock signal of the processor and the abnormality determination lower limit threshold value, by the abnormality determining part. Furthermore, when it is determined that the frequency is the abnormal value on the side where the frequency is decreased by the abnormal behavior reducing part, it is possible to perform the correction of reducing the output value of the functional part having the phase characteristic function of the phase advance characteristic to reduce the abnormal behavior.

According to an eleventh aspect of the present invention, in the in-vehicle electronic control apparatus according to the ninth or tenth aspect of the present invention, the failure detection threshold value corresponding to the frequency of the operation clock signal may include a failure detection upper limit threshold value that is a threshold value on a side where the frequency is increased, the abnormality determination threshold value corresponding to the frequency of the operation clock signal may include an abnormality determination upper limit threshold value that is a threshold value on the side where the frequency is increased, the failure diagnosis part determines whether or not the frequency is a value in the failure detection range based on the frequency and the failure detection upper limit threshold value with respect to a functional part that has the phase characteristic function of the phase delay characteristic, the abnormality determining part may determine whether or not the frequency is an abnormal value based on the frequency and the abnormality determination upper limit threshold value with respect to the functional part that has the phase characteristic function of the phase delay characteristic, and the abnormality behavior reducing part may perform a correction of increasing an output value of the functional part that has the phase characteristic function of the phase delay characteristic used in the actuator control unit by a predetermined value with respect to the functional part that has the phase characteristic function of the phase delay characteristic, when it is determined that the frequency is an abnormal value that exceeds the abnormality determination upper limit threshold value on the side where the frequency is increased.

According to this configuration, it is possible to determine whether or not the frequency is a value in the failure range on the side where the frequency is increased based on the frequency of the operation clock signal of the processor and the failure detection upper limit threshold value, by the failure diagnosis part. Further, it is possible to determine whether or not the frequency is the abnormal value on the side where the frequency is increased based on the frequency of the operation clock signal of the processor and the abnormality determination upper limit threshold value, by the abnormality determining part. Furthermore, when it is determined that the frequency is the abnormal value on the side where the frequency is increased by the abnormal behavior reducing part, it is possible to perform the correction of increasing the output value of the control unit having the phase characteristic function of the phase delay characteristic to reduce the abnormal behavior.

According to a twelfth aspect of the present invention, in the in-vehicle electronic control apparatus according to any one of the first to eleventh aspects of the present invention, the abnormal behavior reducing part may perform any one of a limit process of limiting a maximum value with respect to a correction target value, a gain correction process of multiplying the correction target value by a gain and an offset correction process of adding an offset value to the correction target value to reduce the abnormal behavior.

According to this configuration, it is possible to perform any one of the limit process of limiting the maximum value with respect to the correction target value, the gain correction process of multiplying the correction target value by the gain and the offset correction process of adding the offset value to the correction target value, by the abnormal behavior reducing part, to reduce the abnormal behavior.

According to a thirteenth aspect of the present invention, in the in-vehicle electronic control apparatus according to any one of the first to twelfth aspects of the present invention, the actuator may be an electric motor, the actuator control unit may include a processor, and an A/D converter configured to convert an analog input value into a digital value to input the converted digital value to the processor, the in-vehicle electronic control apparatus may further include a position detection sensor configured to detect a rotation position of a rotator that forms the electric motor, the main functional part has a function, as the first function, of calculating, on the processor, a rotation angle of the electric motor based on a rotation position detected by the position detection sensor, which is the physical value, and the alternative functional part has a function, as the first function, of estimating, on the processor, a rotation angle of the electric motor based on a motor terminal voltage and a motor current voltage of the electric motor, which are the physical value.

According to this configuration, when the main functional part calculates the rotation angle of the electric motor by using the detection value of the position detection sensor of a resolver or the like, it is possible to accurately diagnose the failure by the failure diagnosis part. Further, when the main functional part has a failure, it is possible to switch the first control process to the second control process based on the output value of the alternative functional part that estimates the rotation angle of the electric motor by using the motor terminal voltage and the motor current of the electric motor.

Advantageous Effects of Invention

According to the present invention, it is possible to diagnose the failure of the main functional part having the function relating to the drive-control of the actuator by the failure diagnosis part having the operation guaranteed range wider than the operation guaranteed range of the main functional part. Thus, even in an operational environment where the operation of the main functional part is abnormal or in an operational environment where the main functional part is damaged, when the operational environment is an environment within a range where the failure diagnosis part operates normally, it is possible to accurately diagnose a failure in the main functional part.

Further, it is possible to detect the abnormality of the failure diagnosis part by the failure monitoring part having the operation guaranteed range wider than the operation guaranteed range of the failure diagnosis part. Further, when the failure is detected by the failure monitoring part, it is possible to stop the operation of the in-vehicle electronic control apparatus. Thus, even in an operational environment where the operation of the failure diagnosis part is abnormal or in an operational environment where the failure diagnosis part is damaged, when the operational environment is an environment within a range where the failure monitoring part operates normally, it is possible to accurately diagnose an abnormality of the failure diagnosis part. Further, when the failure diagnosis part has a failure and it is thus difficult to accurately diagnose the failure of the main functional part or the alternative functional part, it is possible to maintain the in-vehicle electronic control apparatus in a relatively safe state.

Moreover, according to the present invention, when the physical value used in the main functional part or the alternative functional part becomes the abnormal value in a borderline range where the failure is not detected, it is possible to reduce the abnormal behavior generated by the abnormal value. Thus, it is possible to reduce a possibility that a dangerous behavior may occur without using a component of high accuracy and high cost and without narrowing a failure detection margin, and to maintain a system including the in-vehicle electronic control apparatus in a safe state.

DESCRIPTION OF EMBODIMENTS (First Embodiment)

A first embodiment of the present invention will be described with reference to the drawings. FIG. 1 to FIG. 13 are diagrams illustrating a first embodiment of an in-vehicle electronic control apparatus according to the present invention. The present embodiment provides an embodiment when the in-vehicle electronic control apparatus according to the present invention is applied to an electric power steering apparatus that applies a steering auxiliary force to an in-vehicle steering mechanism.

(Configuration)

Firstly, a configuration of the steering mechanism will be described.

Figure 1:
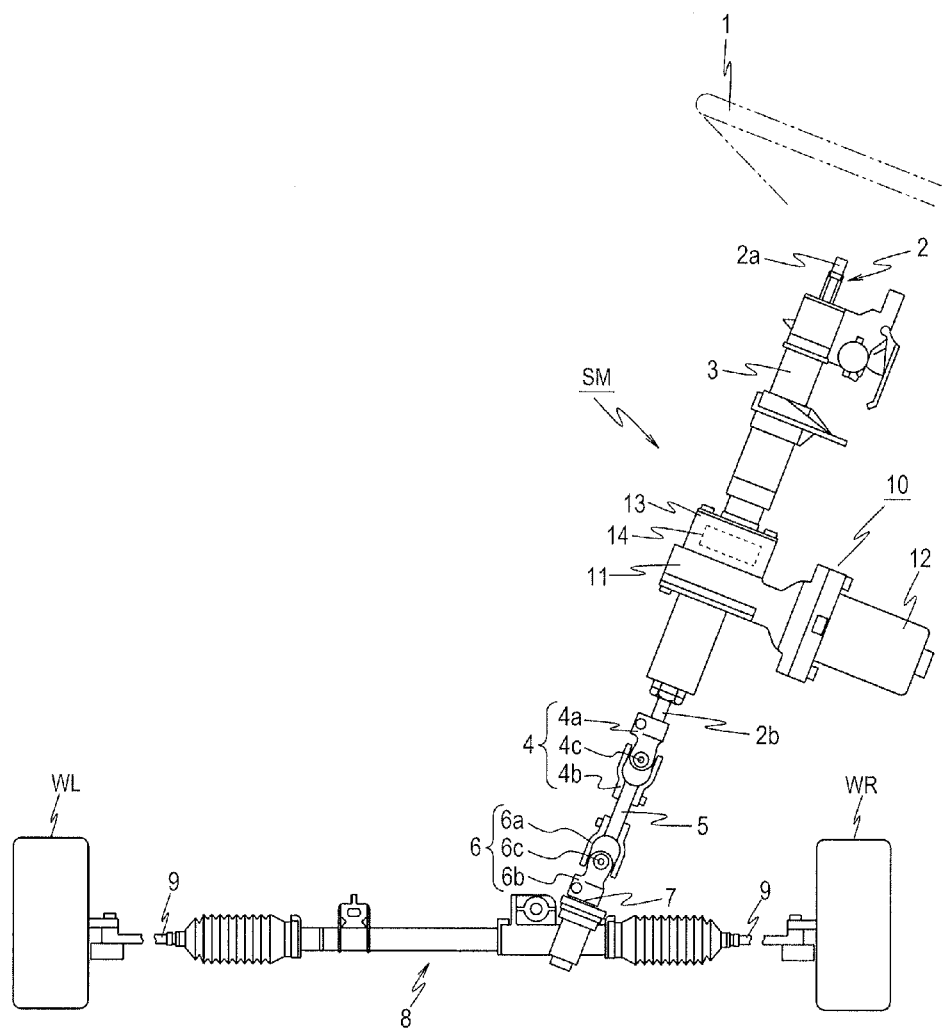
FIG. 1 is a diagram illustrating a schematic configuration of an in-vehicle electronic control apparatus according to an embodiment of the present invention.

FIG. 1 is a diagram illustrating a schematic configuration of a steering mechanism driven by a power steering apparatus according to the present embodiment.

As illustrated in FIG. 1, a steering mechanism SM includes a steering shaft 2 including an input shaft 2a that transmits a steering force acting from a driver to a steering wheel 1, and an output shaft 2b connected to the input shaft 2a through a torsion bar, not illustrated. The steering shaft 2 is rotatably built into a steering column 3, in which an end of the input shaft 2a is connected to the steering wheel 1 and the other end thereof is connected to the torsion bar, not illustrated.

Further, the steering force transmitted to the output shaft 2b is transmitted to an intermediate shaft 5 through a universal joint 4 including two yokes 4a and 4b and a cross connecting part 4c that connects the two yokes 4a and 4b. Further, the steering force transmitted to the intermediate shaft 5 is transmitted to a pinion shaft 7 through a universal joint 6 including two yokes 6a and 6b and a cross connecting part 6c that connects the two yokes 6a and 6b. Further, the steering force transmitted to the pinion shaft 7 is converted into a straight motion in a vehicle width direction by a steering gear mechanism. 8 to then be transmitted to right and left tie rods 9, and turns turning wheels WL and WR by the tie rods 9.

A steering auxiliary mechanism 10 that transmits a steering auxiliary force to the output shaft 2b is connected to the output shaft 2b of the steering shaft 2. The steering auxiliary mechanism 10 includes a speed reduction mechanism 11 connected to the output shaft 2b, and an electric motor 12 that is an electromotor that is connected to the speed reduction mechanism 11 to generate the steering auxiliary force, for example, a brushless motor.

Further, a steering torque sensor 14 that is steering torque detection means is provided in a housing 13 connected to the speed reduction mechanism 11 on the side of the steering wheel 1. The steering torque sensor 14 detects steering torque that is applied to the steering wheel 1 and is transmitted to the input shaft 2a. The steering torque sensor 14 is configured to convert the steering torque into torsional angular displacement of the torsion bar, not illustrated, interposed between the input shaft 2a and the output shaft 2b, for example, and to detect the torsional angular displacement by a non-contact magnetic sensor.

Next, a configuration of an Electronic Control Unit (ECU) 15 that controls driving of the electric motor 12 will be described with reference to FIG. 2.

Figure 2:
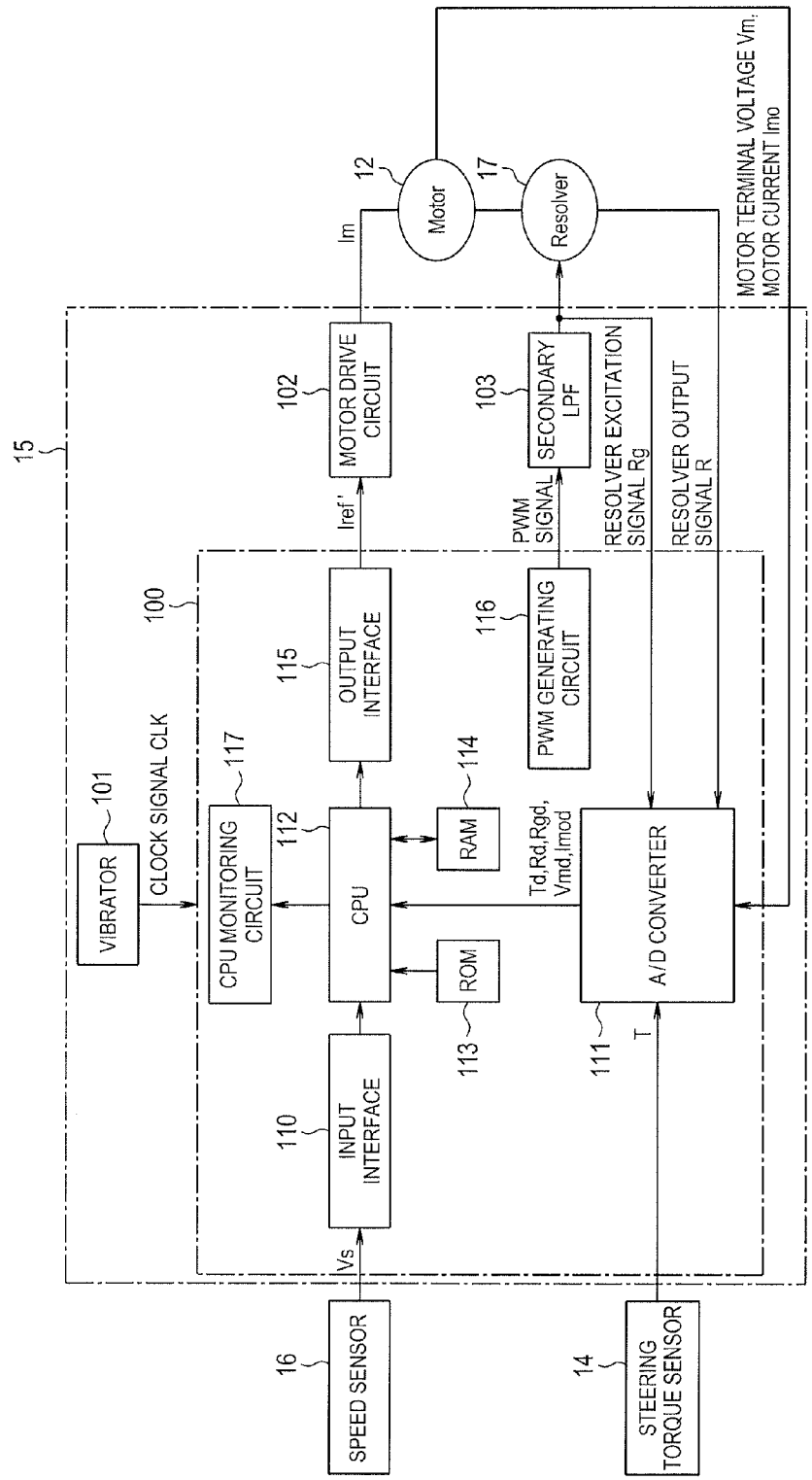
FIG. 2 is a schematic configuration diagram of an ECU 15.

FIG. 2 is a diagram illustrating a schematic configuration of the ECU 15.

As illustrated in FIG. 2, the ECU 15 includes an MCU 100 that carries out a control process of the electric motor 12; a vibrator 101 that provides a clock signal CLK (hereinafter, simply referred to as CLK) to the MCU 100; a motor drive circuit 102 that drives the electric motor 12; and a secondary Low Pass Filter (LPF) 103 that outputs a resolver excitation signal Rg obtained by removing a high frequency component (i.e., noise component) from a PWM signal input from the MCU 100.

The MCU 100 includes an input interface 110 through which a vehicle speed detection value Vs is input from a speed sensor 16, and an A/D converter 111 that converts an analog signal into a digital signal. In the present embodiment, the A/D converter 111 converts analog signals such as a torque detection value T from the steering torque sensor 14, a resolver output signal R from a resolver 17, the resolver excitation signal Rg from the secondary LPF 103, and a motor terminal voltage Vm and a motor current Imo from the electric motor 12, into digital signals.

The MCU 100 further includes a Central Processing Unit (CPU) 112 that controls the driving of the electric motor 12 so as to carry out a steering auxiliary control process of generating a steering auxiliary force based on the steering torque.

The CPU 112 carries out the steering auxiliary control process based on the vehicle speed detection value Vs from the input interface 110, a torque detection value Td, a resolver output signal value Rd, a resolver excitation signal value Rgd, and a motor terminal voltage value Vmd and a motor current value Imod that are digital conversion values from the A/D converter 111.

Here, in the present embodiment, a part of a functional part relating to the drive-control of the electric motor 12 includes a main functional part having a first function and an alternative functional part having a second function that is an alternative of the first function. Either one or both of the main functional part and the alternative functional part may be configured with software, or may be configured with hardware.

The CPU 112 carries out a process of each functional part configured with the software, as a part of the steering auxiliary control process. Further, the CPU 112 carries out a failure diagnosis process that diagnoses failures of the main functional part and the alternative functional part. Further, the CPU 112 carries out a control process by using an output value of the functional part diagnosed as normal, among the main functional part and the alternative functional part, based on the process result of the failure diagnosis process.

Further, in the present embodiment, the ECU 15 has a function of detecting an abnormality of the component that diagnoses the failures of the main functional part and the alternative functional part, and stopping the operation of the electric power steering apparatus when the abnormality is detected in the component.

Hereinafter, the above-described series of operations will be referred to as a robust control process.

Here, the failure includes a state where the main functional part or the alternative functional part is disabled due to damage or the like of a device that carries out a process relating to each function or a device that provides a physical value used in the former device. Further, the failure includes a state where the main functional part or the alternative functional part can carry out its operation but an output value thereof is abnormal. For example, the failure includes a state where the main functional part or the alternative functional part is operated in an operational environment that is beyond an operation guaranteed range.

Further, the operation guaranteed range includes operation guaranteed ranges of various sensors that provide physical values used in the main functional part or the alternative functional part. Further, the operation guaranteed range includes an operation guaranteed range of a device that carries out a process of realizing the function of the main functional part or the alternative functional part. For example, the operation guaranteed range includes an operation temperature range, an operation frequency range, an operation voltage range, an operation current range or the like where a related sensor or device operates normally.

The MCU 100 further includes a ROM 113 that is a storage part that stores a program and data necessary for the steering auxiliary control process carried out in the CPU 112.

The ROM 113 includes a program storage area that stores a steering auxiliary control process program that is a main program for allowing the CPU 112 to carry out the steering auxiliary control process. Further, the ROM 113 includes a program storage area that stores a robust control process program that is a sub program for allowing the CPU 112 to carry out the robust control process. Furthermore, the ROM 113 includes a data storage area that stores data that does not change, such as parameters necessary for the steering auxiliary control process and the robust control process.

Further, the MCU 100 includes a RAM 114, an output interface circuit 115 and a PWM generating circuit 116.

In the present embodiment, the RAM 114 stores detection data regarding the torque detection value Td, the resolver output signal value Rd, the resolver excitation signal value Rgd, the motor terminal voltage value Vmd, the motor current value Imod or the like, and data necessary for process steps of the various processes carried out by the CPU 112 or process results.

The output interface 115 outputs a compensated steering auxiliary torque command value Iref computed by the CPU 112 to the motor drive circuit 102.

The PWM generating circuit 116 generates a PWM signal that is a reference waveform signal of a resolver excitation signal that excites the resolver 17.

The motor drive circuit 102 controls a drive current that is supplied to the electric motor 12 based on the compensated steering auxiliary torque command value Iref output from the MCU 100.

The secondary LPF 103 is a secondary low pass filter, and reduces a frequency component equal to or higher than a predetermined cutoff frequency, in an input signal. In the present embodiment, the secondary LPF 103 removes (reduces) a noise component of the PWM signal generated by the PWM generating circuit 116. The secondary LPF 103 outputs the resolver excitation signal Rg that is a PWM signal in which the noise component is removed to the resolver 17. Thus, the resolver 17 is excited, and the resolver output signal R based on a rotation position of the electric motor 12 is output from the resolver 17.

Figure 3:
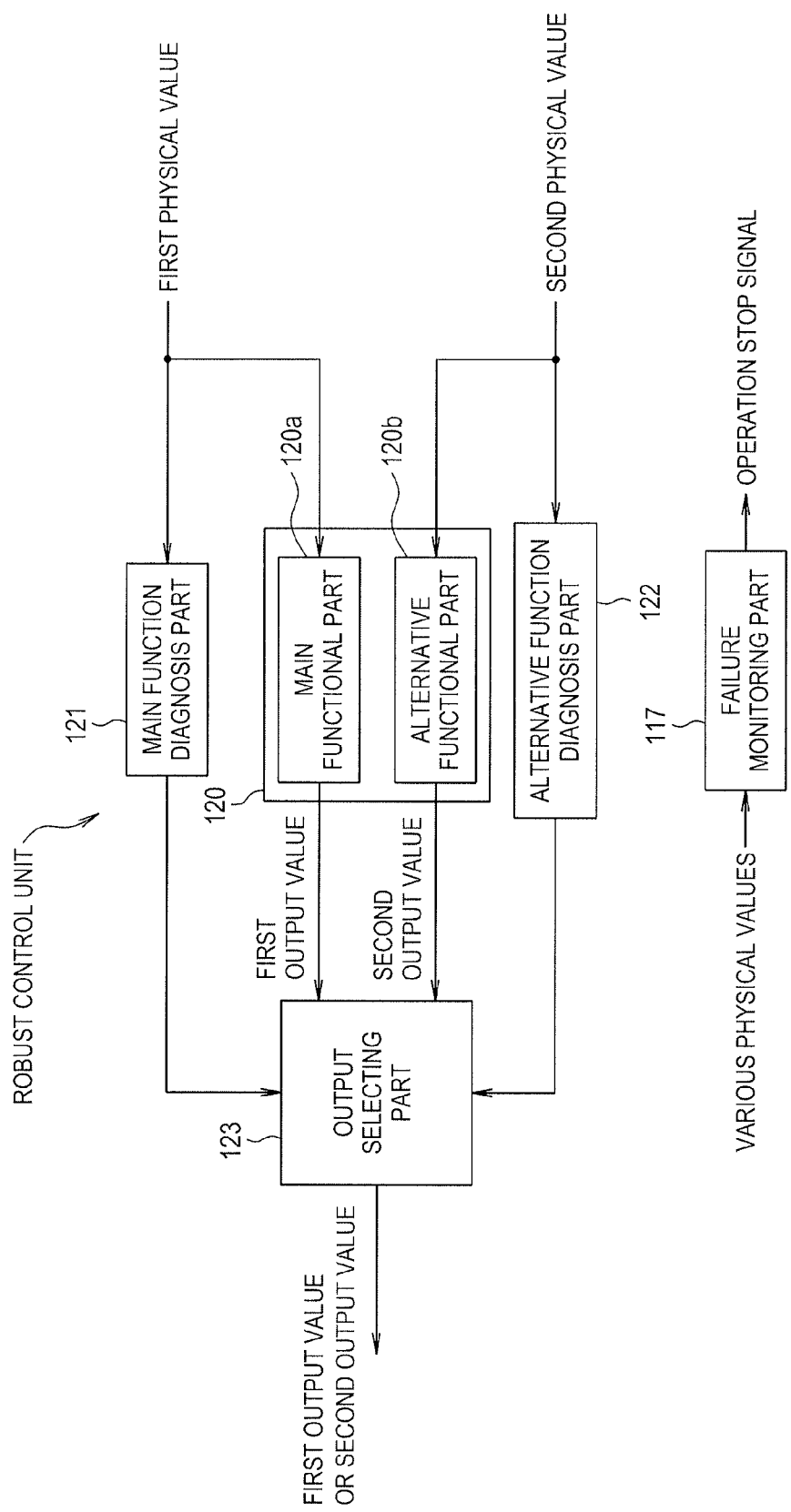
FIG. 3 is a block diagram illustrating a specific configuration of a robust control unit.

Next, a specific configuration of the robust control unit that performs the robust control process will be described with reference to FIG. 3. FIG. 3 is a block diagram illustrating an example of a specific configuration of the robust control unit.

As illustrated in FIG. 3, the robust control unit includes a functional part 120 as a part of the functional part relating to the drive-control of the electric motor 12. The functional part 120 includes a main functional part 120a having a first function, and an alternative functional part 120b having a second function that is an alternative of the first function.

The robust control unit further includes, as a failure diagnosis part, a main function diagnosis part 121 that diagnoses the failure of the main functional part 120a based on a first physical value that is a physical value used in the main functional part 120a and an alternative function diagnosis part 122 that diagnoses the failure of the alternative functional part 120b based on a second physical value that is a physical value used in the alternative functional part 120b.

The robust control unit further includes an output selecting part 123 that selects an output value to be output to a functional part at a subsequent stage based on the diagnosis result of the main function diagnosis part 121 and the diagnosis result of the alternative function diagnosis part 122, and outputs the selected output value to the functional part at the subsequent stage where a control process by using the output value is performed.

Specifically, when it is determined that the main functional part is normal from the failure diagnosis result, the output selecting part 123 carries out a control process (hereinafter, referred to as a first control process) using the output value of the main functional part in preference to a control process (hereinafter, referred to as a second control process) using the output value of the alternative functional part. On the other hand, when it is determined that the main functional part has a failure and the alternative functional part is normal, the output selecting part 123 carries out the second control process instead of the first control process. Further, when it is determined that both of the main functional part and the alternative functional part have a failure, the output selecting part 123 outputs a failure detection signal to a failure handling part, not illustrated. Thus, the failure handling part at least stops the first control process and the second control process that use the output value of the functional part 120. In the present embodiment, the operation of the electric power steering apparatus is stopped.

The robust control unit includes a failure monitoring part 117 that monitors the occurrence of failures of the main function diagnosis part 121 and the alternative function diagnosis part 122 based on physical values relating to the operations of the main function diagnosis part 121 and the alternative function diagnosis part 122.

The failure monitoring part 117 outputs, when the occurrence of the failures of the main function diagnosis part 121 and the alternative function diagnosis part 122 is detected, a failure detection signal is output to the failure handling part, not illustrated. Thus, the failure handling part stops the operation of the electric power steering apparatus.

Figure 4:
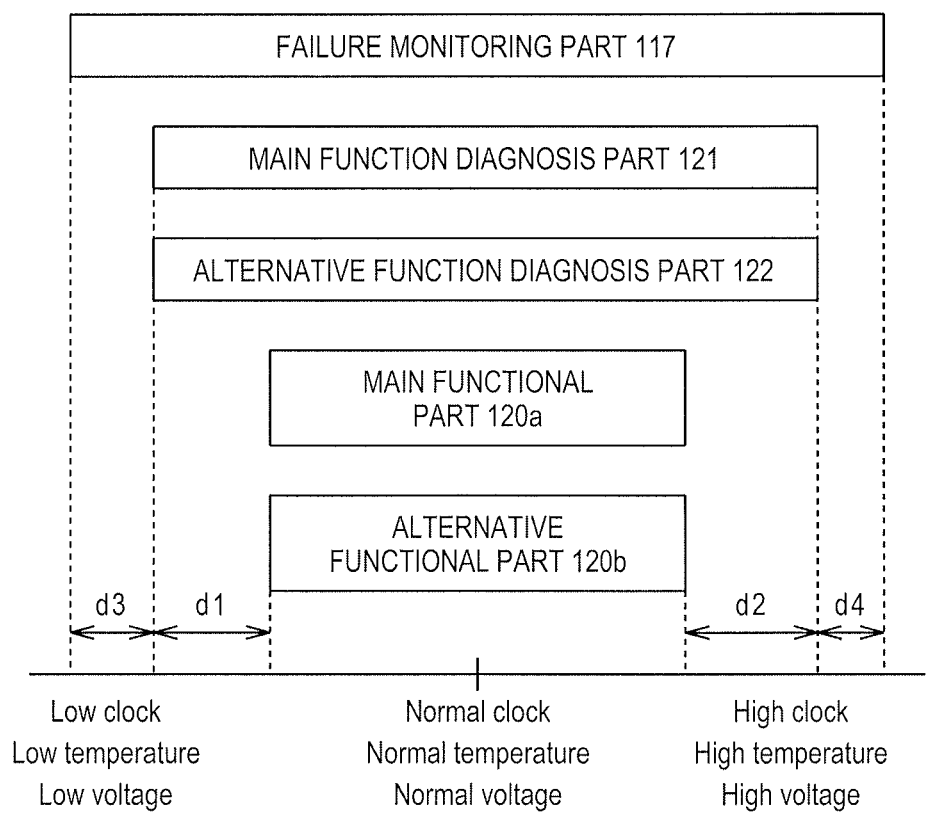
FIG. 4 is a conceptual diagram illustrating an example of an operation guaranteed range of each component that forms the robust control unit.

Next, an operation guaranteed range of each component that forms the robust control unit will be described with reference to FIG. 4. FIG. 4 is a conceptual diagram illustrating an example of the operation guaranteed range of each component that forms the robust control part.

In the example in FIG. 4, with respect to the main functional part 120a, the alternative functional part 120b, the main function diagnosis part 121, the alternative function diagnosis part 122 and the failure monitoring part 117, the relationship of operation guaranteed ranges of an operation frequency, an operation temperature and an operation voltage is conceptually illustrated.

In FIG. 4, the horizontal axis represents a common range of the operation frequency, the operation temperature and the operation voltage, in which "NORMAL . . . " represents a normal operation frequency, a normal operation temperature and a normal operation voltage. Further, "HIGH . . . " represents a high operation frequency, a high operation temperature and a high operation voltage with reference to "NORMAL . . . ", and "LOW . . . " represents a low operation frequency, a low operation temperature and a low operation voltage.

Further, horizontal widths of boxes indicating the main functional part 120a, the alternative functional part 120b, the main function diagnosis part 121, the alternative function diagnosis part 122 and the failure monitoring part 117 represent operation guaranteed ranges of the respective parts.

As illustrated in FIG. 4, in the present embodiment, the main functional part 120a and the alternative functional part 120b have the same operation guaranteed range. Further, the main function diagnosis part 121 and the alternative function diagnosis part 122 have an operation guaranteed range that is wider by d1 on the low side and is wider by d2 on the high side than the operation guaranteed range of the main functional part 120a and the alternative functional part 120b. Further, the failure monitoring part 117 has an operation guaranteed range that is wider by d3 on the low side and is wider by d4 on the high side than the main function diagnosis part 121 and the alternative function diagnosis part 122.

For example, it is assumed that at least one of the operation frequency, the operation temperature and the operation voltage has a value in a range where the main functional part 120a and the alternative functional part 120b do not operate normally. In this case, when the value outside the operation guaranteed range is in the range of d1 or in the range of d2, the main function diagnosis part 121 and the alternative function diagnosis part 122 can operate normally. Accordingly, the main function diagnosis part 121 and the alternative function diagnosis part 122 can accurately diagnose the failures of the main functional part 120a and the alternative functional part 120b. On the other hand, it is assumed that at least one of the operation frequency, the operation temperature and the operation voltage has a value in a range where the main function diagnosis part 121 and the alternative function diagnosis part 122 do not operate normally. In this case, when the value outside the operation guaranteed range is in the range of d3 or in the range of d4, the failure monitoring part 117 can operate normally. Accordingly, the failure monitoring part 117 can accurately detect the occurrence of the failures of the main function diagnosis part 121 and the alternative function diagnosis part 122.

The main function diagnosis part 121 and the alternative function diagnosis part 122 may be configured to be independently operated by a separate power supply or vibrator, with respect to the main functional part 120a and the alternative functional part 120b. With such a configuration, with respect to operation frequency or operation voltage, even though a vibrator or a power supply device relating to the main functional part 120a and the alternative functional part 120b may have a failure, it is possible to normally operate the main function diagnosis part 121 and the alternative function diagnosis part 122. Here, since there is a case where the main function diagnosis part 121 and the alternative function diagnosis part 122 cannot be independently operated with respect to a surrounding environment such as operation temperature, it is necessary to widen the operation guaranteed range with respect to a diagnosis target, as illustrated in FIG. 4. Similarly, the failure monitoring part 117 may be configured to be independently operated by a separate power supply or vibrator, with respect to the main function diagnosis part 121 and the alternative function diagnosis part 122, and in this case, attention has only to be given to the operation guaranteed range where the independent operation is difficult due to an operation temperature environment or the like.

(Robust Control Process)

Figure 5:
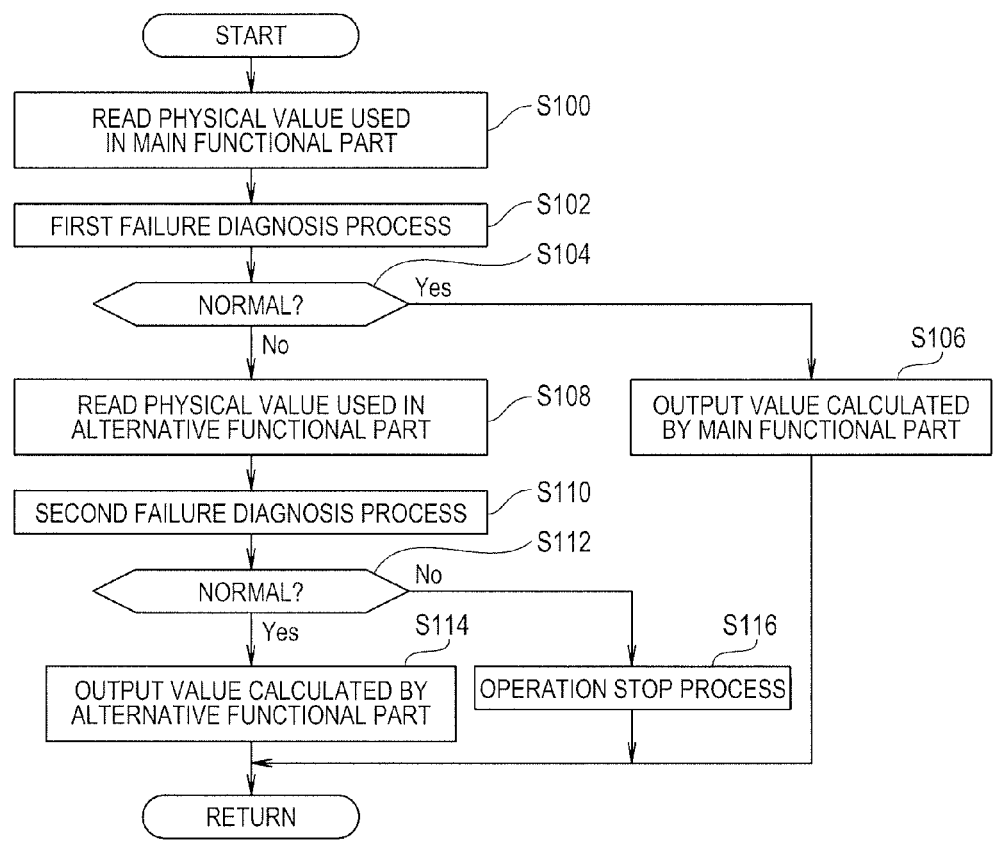
FIG. 5 is a flowchart illustrating an example of a processing procedure of a robust control process.

Next, a processing procedure of the robust control process of the present embodiment will be described with reference to FIG. 5. FIG. 5 is a flowchart illustrating an example of the processing procedure of the robust control process.

The robust control process is started when the CPU 112 of the MCU 100 carries out the robust control process program stored in advance in the ROM 113. When the robust control process is started, as illustrated in FIG. 5, firstly, the procedure goes to step S100. Here, the robust control process program is carried out as a timer interrupt process every predetermined time period (for example, 1 msec).

In step S100, the main function diagnosis part 121 reads the first physical value used in the main functional part 120a, and then, the procedure goes to step S102.

In step S102, the main function diagnosis part 121 carries out a first failure diagnosis process, and then, the procedure goes to step S104.

In the first failure diagnosis process, a failure detection threshold value for the failure diagnosis corresponding to each physical value, stored in the ROM 113 in advance is compared with the read first physical value. Further, by determining whether the first physical value is equal to or larger than the failure detection threshold value, the failure of the main functional part 120a is diagnosed. That is, when it is determined that the first physical value is equal to or larger than the failure detection threshold value, the main functional part 120a is diagnosed as a failure, and when it is determined that the first physical value is smaller than the failure detection threshold value, the main functional part 120a is diagnosed as normal.

The main function diagnosis part 121 outputs the diagnosis result to the output selecting part 123.

In step S104, the output selecting part 123 determines whether or not the main functional part 120a is normal based on the diagnosis result in step S102. Further, when it is determined that the main functional part 120a is normal (Yes), the procedure goes to step S106, and when it is determined that the main functional part 120a has a failure (No), the procedure goes to step S110.

When the procedure goes to step S106, the output selecting part 123 selects an input value from the main functional part 120a, and outputs the selected input value to a control unit at a subsequent stage. Thereafter, a series of processes ends, and then the procedure returns to the start of the process.

On the other hand, when the procedure goes to step S108, the alternative function diagnosis part 122 reads the first physical value used in the alternative functional part 120b, and then the procedure goes to step S110.

In step S110, the alternative function diagnosis part 122 carries out a second failure diagnosis process, and then the procedure goes to step S112. The second failure diagnosis process is assumed to be the same process as the first failure diagnosis process. The alternative function diagnosis part 122 outputs the diagnosis result to the output selecting part 123.

In step S112, the output selecting part 123 determines whether or not the alternative functional part 120b is normal based on the diagnosis result in step S108. Further, when it is determined that the alternative functional part 120b is normal (Yes), the procedure goes to step S114, and when it is determined that the alternative functional part 120b has a failure (No), the procedure goes to step S116.

When the procedure goes to step S114, the output selecting part 123 selects an input value from the alternative functional part 120b, and outputs the selected input value to the control unit at the subsequent state. Thereafter, a series of processes ends, and then the procedure returns to the previous process. The control unit at the subsequent stage is assumed to be a control unit common to the main functional part 120a and the alternative functional part 120b.

On the other hand, when both of the main functional part 120a and the alternative functional part 120b fail and the procedure goes to step S116, the output selecting part 123 outputs a failure detection signal to the failure handling part.

Thereafter, a series of processes ends, and then the procedure returns to the previous process.

Thus, the operation of the electric power steering apparatus is stopped by the failure handling part.

Figure 6:
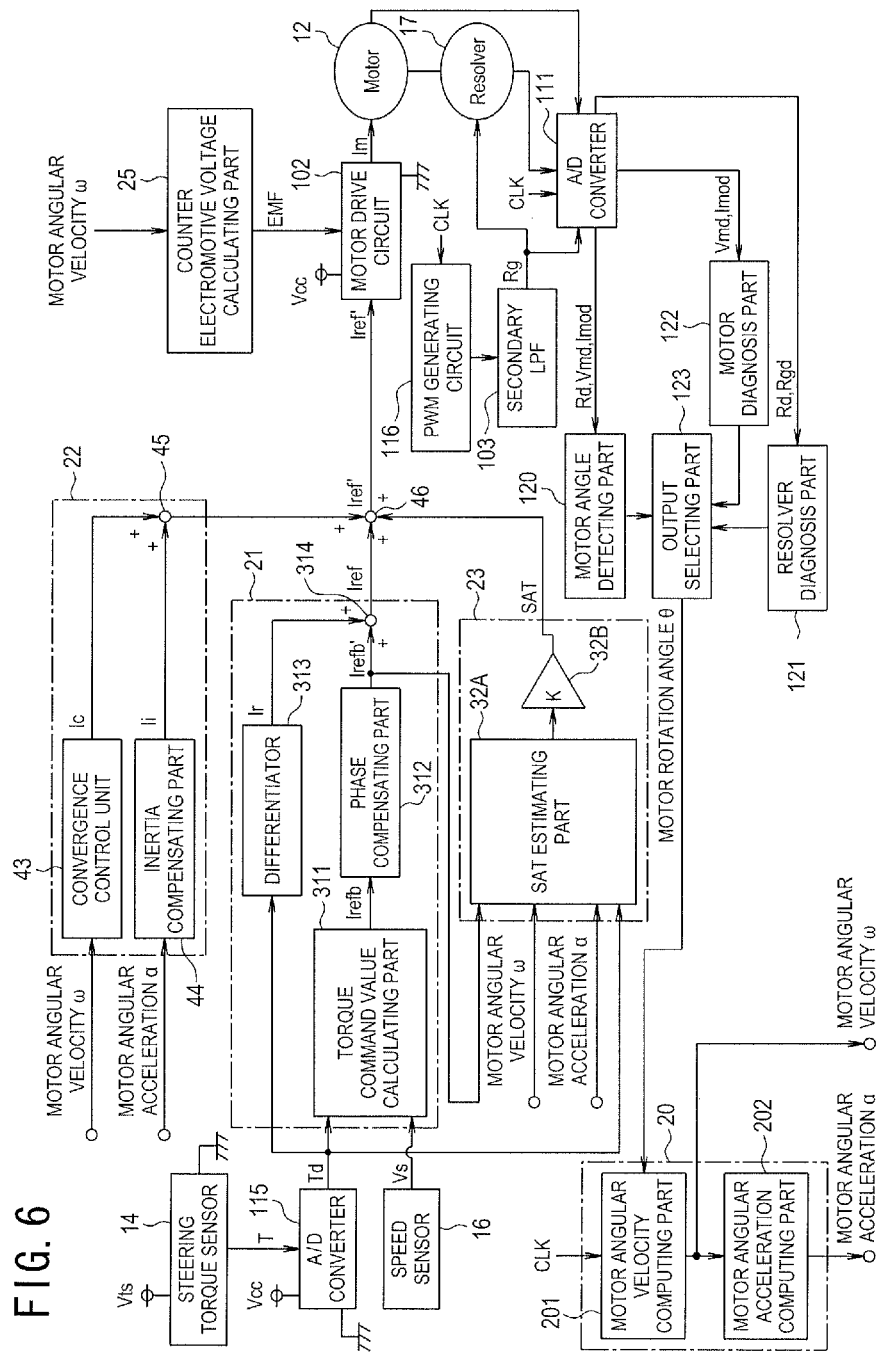
FIG. 6 is a diagram illustrating an example of a specific configuration of the ECU 15 when the robust control unit is applied to a motor rotation angle detecting part.

Then, a configuration in a case where the robust control unit having the above-mentioned configuration is applied to a functional part that detects a motor rotation angle θ of the electric motor steering apparatus illustrated in FIG. 2 will be described with reference to FIG. 6. FIG. 6 is a diagram illustrating a specific configuration of the ECU 15 when the robust control unit is applied to the motor rotation angle detecting part.

As illustrated in FIG. 6, the ECU 15 includes a rotation information computing part 20, a steering auxiliary torque command value computing part 21, a torque command value compensating part 22, a Self Aligning Torque (SAT) estimation feedback part 23, a counter electromotive voltage calculating part 25, and an adder part 46, as specific functional components.

In the present embodiment, the functions of the respective parts include a function realized by carrying out a program by the MCU 100, a function realized only with a hardware configuration, and a function realized by controlling hardware by execution of a program.

The rotation information computing part 20 includes a motor angular velocity computing part 201 that calculates a motor angular velocity ω, and a motor angular acceleration computing part 202 that differentiates the motor angular velocity ω calculated by the motor angular velocity computing part 201 to calculate a motor angular acceleration α.

The steering auxiliary torque command value computing part 21 includes a torque command value calculating part 311, a phase compensating part 312, a center responsiveness improvement part 313, and an adder part 314.

The torque command value calculating part 311 calculates a steering auxiliary torque command value Irefb that is a current command value with reference to a steering auxiliary torque command value calculation map, not illustrated, based on a steering torque Td and a vehicle speed Vs. The steering auxiliary torque command value calculation map is configured with a characteristic line diagram represented by a curve of a parabolic shape in which the horizontal axis represents the steering torque Td, and the vertical axis represents the steering auxiliary torque command value Irefb, with the vehicle speed Vs being a parameter.

The phase compensating part 312 compensates the phase of the steering auxiliary torque command value Irefb output from the torque command value calculating part 311 to calculate a phase compensation value Irefb'.

The center responsiveness improvement part 313 differentiates the steering torque Td based on the steering torque Td input from the A/D converter 111, to calculate a center responsiveness improvement command value Ir for ensuring stability in an assist characteristic dead zone and compensating for static friction. The compensation based on the center responsiveness improvement command value Ir is performed to increase control responsiveness in the vicinity of a neutral steering and to realize smooth steering.

The adder part 314 adds the phase compensation output of the phase compensating part 312 and the center responsiveness improvement command value Ir of the center responsiveness improvement part 313 to calculate a steering auxiliary torque command value Iref.

The torque command value compensating part 22 at least includes a convergence compensating part 43, an inertia compensating part 44, and an adder part 45.

The convergence compensating part 43 compensates convergence of a yaw rate based on the motor angular velocity ω computed by the motor angular velocity computing part 201 of the rotation information computing part 20. Specifically, the convergence compensating part 43 receives an input of the motor angular velocity ω calculated by the motor angular velocity computing part 201, and multiplies the motor angular velocity ω by a convergence control gain Kc to apply a brake to the turning operation of the steering wheel 1, to thereby calculate a convergence compensation value Ic. The yaw convergence of the vehicle is improved by the convergence compensation value Ic.

The inertia compensating part 44 calculates an inertia compensation value Ii for compensating an amount corresponding to torque generated by the inertia of the electric motor 12 based on the motor angular acceleration α computed by the motor angular acceleration computing part 202 of the rotation information computing part 20. Deterioration of an inertial sensation or control responsiveness is prevented by the inertia compensating part 44.

The adder part 45 adds the inertia compensation value Ii calculated by the inertia compensating part 44 and the convergence compensation value Ic calculated by the convergence compensating part 43 to calculate a command compensation value Icom. The adder part 45 outputs the calculated command compensation value Icom to the adder part 46.

The SAT estimation feedback part 23 receives inputs of the steering torque Td, the motor angular velocity ω, the motor angular acceleration α and the steering auxiliary torque command value Irefb calculated by the steering auxiliary torque command value computing part 21, and estimates the self aligning torque SAT based on these inputs.

The principle of an occurrence of the self aligning torque SAT will be described. A steering torque T is generated as a driver steers the steering wheel 1, and the electric motor 12 generates an assist torque Tm according to the steering torque T. As a result, the turning wheels WL and WR are turned, and thus, the self aligning torque SAT is generated as a counterforce. Further, at this time, a torque that is a resistance to the steering of the steering wheel 1 by an inertia J and friction (static friction) Fr of the electric motor 12 is generated. In consideration of equilibrium of these forces, a motion equation is obtained as the following expression (1).

$$J \cdot \alpha + Fr \cdot sign(\omega) + SAT = Tm + T \quad (1)$$

Here, when the expression (1) is Laplace transformed by using an initial value of zero and is solved with respect to the self aligning torque SAT, the following expression (2) is obtained.

$$SAT(s) = Tm(s) + T(s) - J \cdot \alpha(s) + Fr \cdot sign(\omega(s)) \quad (2)$$

As understood from the expression (2), by calculating in advance the inertia J and the static friction Fr of the electric motor 12 as constants, it is possible to estimate the self aligning torque SAT from the motor angular velocity ω, the motor angular acceleration α, the assist torque Tm and the steering torque T (Td' in the present embodiment). Here, since the assist torque Tm is proportional to the steering auxiliary torque command value Irefb, the steering auxiliary torque command value Irefb, instead of the assist torque Tm, is applied.

The adder part 46 adds the command compensation value Icom calculated by the adder part 45, the steering auxiliary torque command value Iref output from the steering auxiliary torque command value computing part 21, and the SAT output from the SAT estimation feedback part 23, to calculate the compensated steering auxiliary torque command value Iref'. The adder part 46 outputs the calculated compensated steering auxiliary torque command value Iref' to the motor drive circuit 102.

The counter electromotive voltage calculating part 25 multiplies the motor angular velocity ω from the motor angular velocity computing part 201 by a preset induced voltage constant Ke, to calculate a counter electromotive voltage EFM.

Here, the relationship between voltage and current of the electric motor 12 may be expressed as the following expression (3).

$$Vm = EMF \cdot (R + s \cdot L) \cdot I \quad (3)$$

Here, Vm represents a terminal voltage of the motor, EMF represents the counter electromotive voltage of the motor, I represents a motor winding current, R represents a motor winding resistance value, and L represents a winding inductance value of the motor. s represents a Laplace operator, which represents d/dt. Here, EMF is expressed as the following expression (4).

$$EMF = Ke \cdot \omega \quad (4)$$

The counter electromotive voltage calculating part 25 outputs the calculated EMF to an adder part 242 (to be described later) of the motor drive circuit 102.

Figure 7:
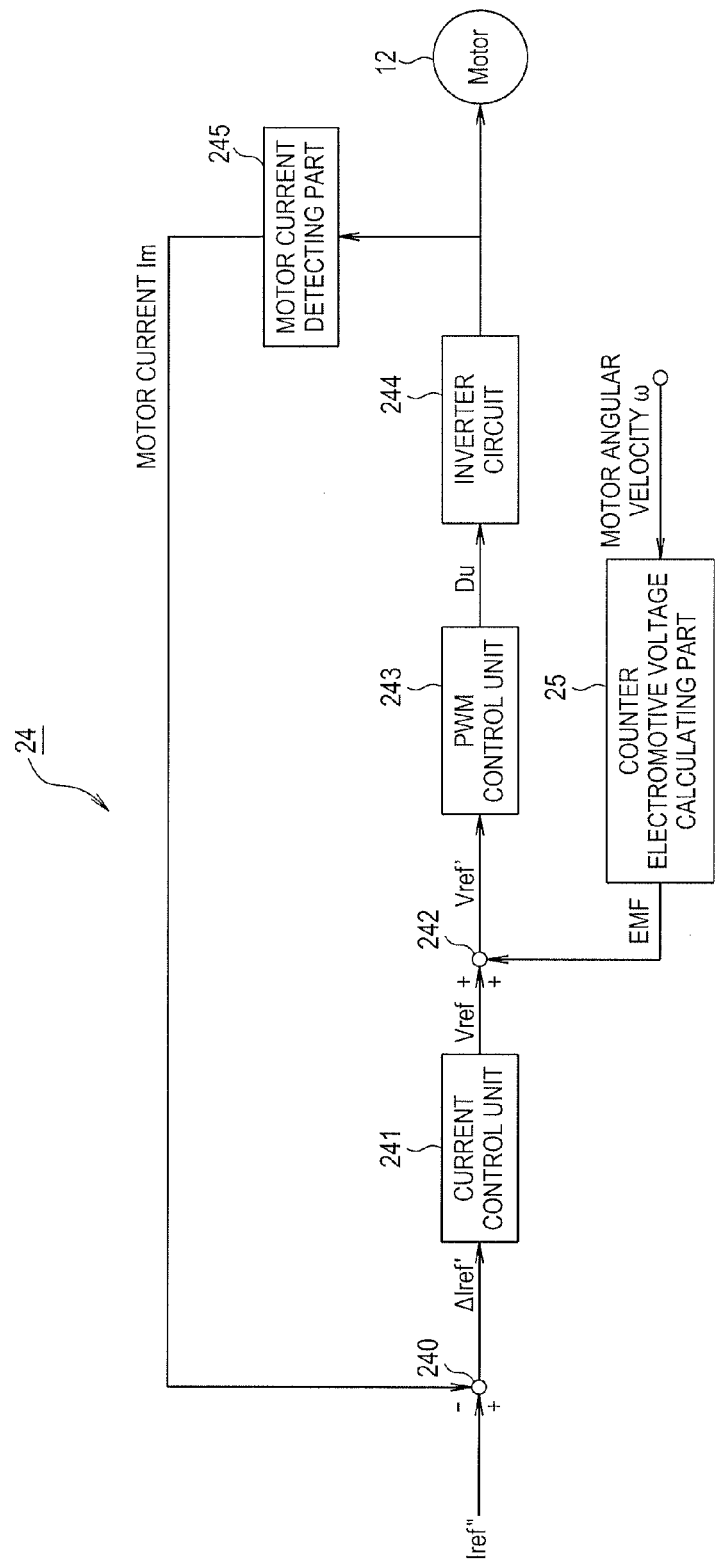
FIG. 7 is a block diagram illustrating an example of a specific configuration of a motor drive circuit 102.

Here, FIG. 7 is a block diagram illustrating an example of a specific configuration of the motor drive circuit 102.

As illustrated in FIG. 7, the motor drive circuit 102 includes a subtraction part 240, a current control unit 241, an adder part 242, a PWM control unit 243, an inverter circuit 244, and a motor current detecting part 245.

The subtraction part 240 subtracts a motor current Im detected by the motor current detecting part 245 from the compensated steering auxiliary torque command value Iref' output from the adder part 46 to calculate a current deviation ΔIref'. The subtraction part 240 outputs the calculated current deviation ΔIref' to the current control unit 241.

The current control unit 241 performs proportionate integration control on the basis of the current deviation ΔIref' output from the subtraction part 240 and calculates a voltage command value Vref. The current control unit 241 outputs the calculated voltage command value Vref to the adder part 242.

The adder part 242 adds the voltage command value Vref output from the current control unit 241 and the counter electromotive voltage EMF output from the counter electromotive voltage calculating part 25. Thus, the counter electromotive voltage compensation is performed, and the compensated voltage command value Vref' is calculated. The adder part 242 outputs the calculated compensated voltage command value Vref' to the PWM control unit 243.

The PWM control unit 243 divides the voltage applied to the inverter circuit 244 by the compensated voltage command value Vref' output from the adder part 242, and converts the result into a PWM duty cycle. The PWM control unit 243 forms a Pulse Width Modulation (PWM) signal Du based on the PWM duty cycle. The PWM control unit 243 outputs the formed pulse width modulation signal Du to the inverter circuit 244.

The inverter circuit 244 controls a gate of a field effect transistor by the pulse width modulation signal output from the PWM control unit 243, and supplies the motor current Im based on the compensated steering auxiliary command value Iref to the electric motor 12.

Referring back to FIG. 6, the ECU 15 further includes, as the robust control unit, the motor rotation angle detecting part 120, the resolver diagnosis part 121, the motor diagnosis part 122, and the output selecting part 123.

Figure 8:
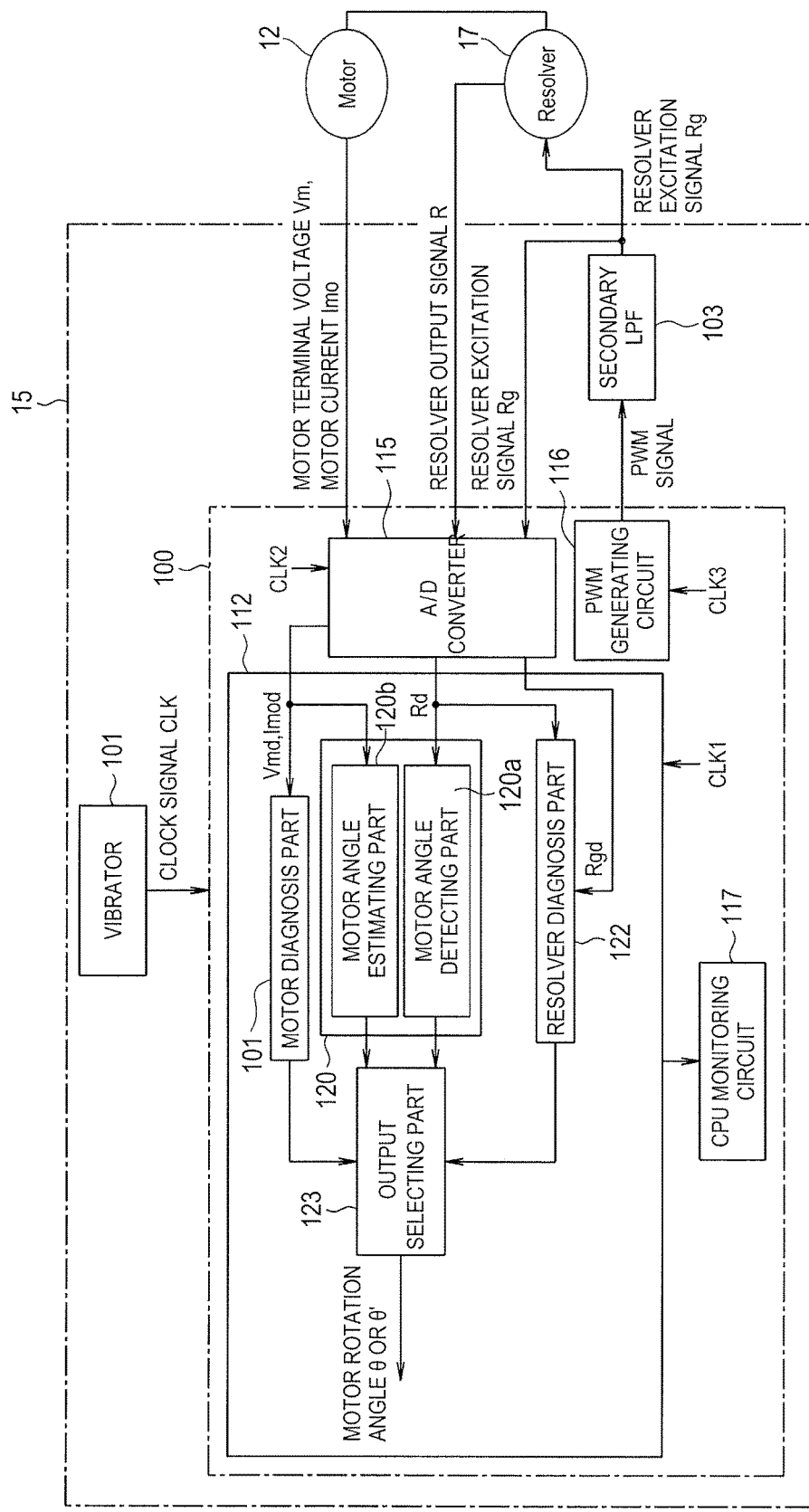
FIG. 8 is a diagram illustrating a specific configuration when the robust control unit of the present embodiment is applied to the motor rotation angle detecting part.

Here, FIG. 8 is a diagram illustrating a specific configuration when the robust control unit of the present embodiment is applied to the motor rotation angle detecting part.

In the present embodiment, as illustrated in FIG. 8, the robust control unit is a functional part in which the motor rotation angle detecting part 120, the resolver diagnosis part 121, the motor diagnosis part 122 and the output selecting part 123 are realized by carrying out exclusive software in the CPU 112.

Further, in the present embodiment, the robust control unit includes, as the failure monitoring part, the CPU monitoring circuit 117 operating independently of the motor rotation angle detecting part 120, the resolver diagnosis part 121, the motor diagnosis part 122 and the output selecting part 123.

As illustrated in FIG. 8, the motor rotation angle detecting part 120 includes the motor angle detecting part 120*a* that is the main functional part, and the motor angle estimating part 120*b* that is the alternative functional part.

The motor angle detecting part 120*a* has the first function of detecting (calculating) the rotation angle θ of the electric motor 12 based on the resolver output signal value Rd that is a digital value of the resolver output signal R from the resolver 17.

The motor angle estimating part 120*b* has the second function of estimating the rotation angle θ of the electric motor 12 (calculating an estimated value θ') based on the motor terminal voltage value Vmd and the motor current value Imod that are digital values of the motor terminal voltage Vm and the motor current Imo from the electric motor 12.

That is, the motor angle detecting part 120*a* and the motor angle estimating part 120*b* are configured to realize the same function by using different physical values.

The resolver diagnosis part 121 corresponds to the main function diagnosis part, which diagnoses a failure of the resolver 17 based on the resolver output signal value Rd and the resolver excitation signal value Rgd, to diagnose the failure of the motor angle detecting part 120*a*.

The motor diagnosis part 122 corresponds to the alternative diagnosis part, which diagnoses the failure of the electric motor 12 based on the motor terminal voltage value Vmd and the motor current value Imod, to diagnose the failure of the motor angle estimating part 120*b*.

The output selecting part 123 selects an input value from any one of the motor angle detecting part 120*a* and the motor angle estimating part 120*b* based on the diagnosis result from the resolver diagnosis part 121 and the diagnosis result from the motor diagnosis part 122, and outputs the selected input value to the rotation information computing part 20 that is a control unit at a subsequent stage. Further, when it is determined that both of the motor angle detecting part 120*a* and the motor angle estimating part 120*b* have a failure, the output selecting part 123 outputs a failure detection signal Er to the failure handling part.

The CPU monitoring circuit 117 monitors the occurrence of the failure of the CPU 112. The CPU monitoring circuit 117 outputs, when it is determined that the failure of the CPU 112 occurs, the failure detection signal Er to the failure handling part to stop the operation of the electric power steering apparatus.

That is, when the CPU 112 has a failure, all the functions of the motor rotation angle detecting part 120, the resolver diagnosis part 121, the motor diagnosis part 122 and the output selecting part 123 that realize their functions by carrying out software by the CPU 112 enter an abnormal state or a stop state. Accordingly, when it is detected that the CPU 112 has a failure, the operation of the electric power steering apparatus is stopped in view of safety.

Figure 9:
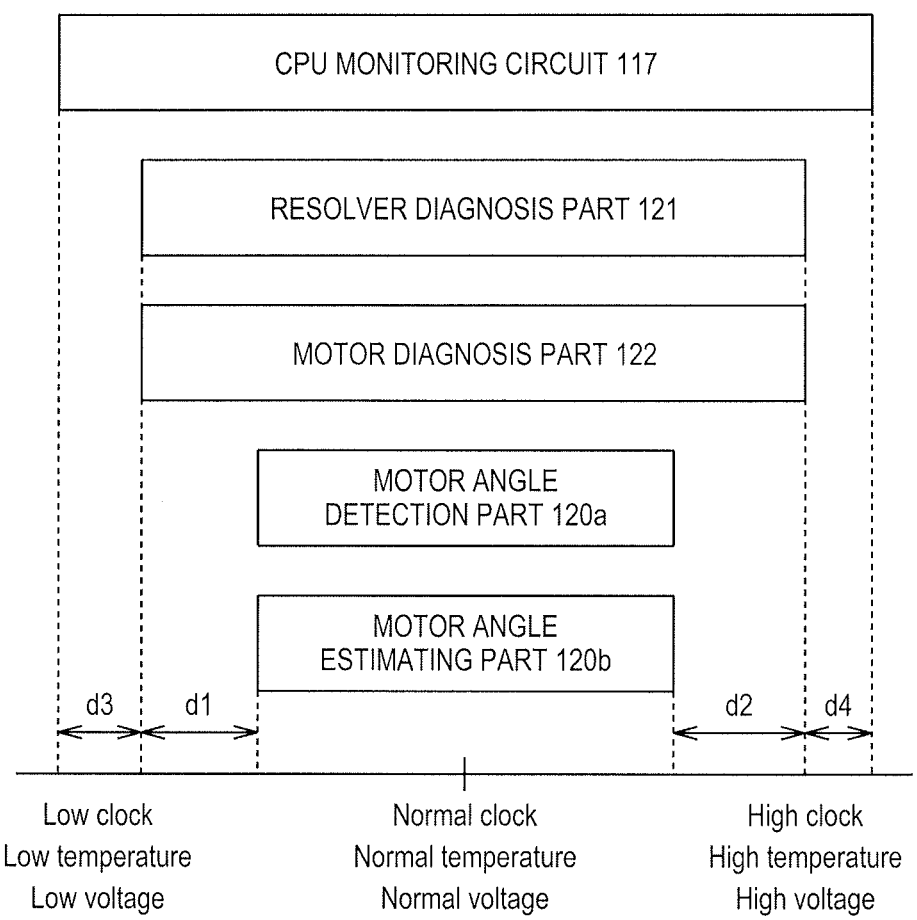
FIG. 9 is a conceptual diagram illustrating an example of an operation guaranteed range of each component when the robust control unit is applied to the motor rotation angle detecting part.

Here, FIG. 9 is a conceptual diagram illustrating an example of an operation guaranteed range of each component when the robust control unit is applied to the motor rotation angle detecting part.

The example of FIG. 9 is the same as the example of FIG. 4 in the content of each axis and operation guaranteed ranges.

As illustrated in FIG. 9, the motor angle detecting part 120*a* and the motor angle estimating part 120*b* have the same operation guaranteed range, which is the narrowest operation guaranteed range. Further, the resolver diagnosis part 121 and the motor diagnosis part 122 have the operation guaranteed range wider by d1 on the low side and is wider by d2 on the high side than the operation guaranteed range of the motor angle detecting part 120*a* and the motor angle estimating part 120*b*. Further, the CPU monitoring circuit 117 has the operation guaranteed range wider by d3 on the low side and is wider by d4 on the high side than the resolver diagnosis part 121 and the motor diagnosis part 122.

Here, it is assumed that at least one of the operation frequency, the operation temperature, and the operation voltage has a value in a range where the motor angle detecting part 120*a* and the motor angle estimating part 120*b* do not operate normally. In this case, for example, when the value outside the operation guaranteed range is in the range of d1 or in the range of d2, the resolver diagnosis part 121 and the motor diagnosis part 122 are operating normally. Thus, the resolver diagnosis part 121 and the motor diagnosis part 122 can accurately diagnose the failures of the motor angle detecting part 120*a* and the motor angle estimating part 120*b*.

On the other hand, it is assumed that at least one of the operation frequency, the operation temperature, and the operation voltage has a value in a range where neither the resolver diagnosis part 121 nor the motor diagnosis part 122 operates normally. In this case, the resolver diagnosis part 121 and the motor diagnosis part 122 cannot accurately diagnose the failures of the motor angle detecting part 120*a* and the motor angle estimating part 120*b*. When the value outside the operation guaranteed range is in the range of d3 or in the range of d4, the CPU monitoring circuit 117 operates normally. Thus, it is possible to accurately detect the occurrence of the failures of the resolver diagnosis part 121 and the motor diagnosis part 122 by the CPU monitoring circuit 117. Further, in the failure detection, it is possible to stop the operation of the electric power steering apparatus.

(Operation)

Next, the operation of the electric power steering apparatus of the present embodiment will be described.

When an ignition signal is turned on and a power supply of a vehicle is turned on, various sensors, the electric motor 12, the ECU 15 and the like start their operations. Thus, respective detection values from the steering torque sensor 14, the speed sensor 16, the resolver 17, the electric motor 12 and the like are input to the MCU 100. Among these detection values, the vehicle speed detection value Vs is input to the CPU 112 through the input interface 110. On the other hand, the torque detection value T, the resolver output value R, the resolver excitation signal Rg, the motor terminal voltage Vm and the motor current Imo are converted into the digital values by the A/D converter 111. Then, the torque detection value T, the resolver output value Rd, the resolver excitation signal Rgd, the motor terminal voltage Vmd and the motor current Imod that are the digital values are input to the CPU 112.

The CPU 112 computes the motor rotation angle θ based on the resolver signal value Rd, in the motor angle detecting part 120a. Further, the CPU 112 outputs the computed motor rotation angle θ to the output selecting part 123. On the other hand, the CPU 112 computes the estimated value θ' of the motor rotation angle θ based on the motor terminal voltage value Vmd and the motor current value Imo, in the motor angle estimating part 120b. Further, the CPU 112 outputs the computed motor rotation angle θ' to the output selecting part 123.

The computation processes of the motor rotation angles θ and θ' are repeated at a predetermined sampling cycle.

Further, the CPU 112 reads the resolver signal value Rd and the resolver excitation signal value Rgd from a buffer memory (not illustrated) of the A/D converter 111, in the resolver diagnosis part 121 (S100). Further, by determining whether or not the resolver 17 has a failure based on the resolver signal value Rd and the resolver excitation signal value Rgd, the CPU 112 determines whether or not the motor angle detecting part 120a has a failure (S102).

Here, it is assumed that the resolver 17 is determined to be operating normally and the motor angle detecting part 120a is determined to be operating normally (Yes in S102). Thus, the diagnosis result indicating that the resolver 17 and the motor angle detecting part 120a are operating normally is output to the output selecting part 123. The output selecting part 123 determines that the motor angle detecting part 120a is normal based on the diagnosis result, and outputs the motor rotation angle θ computed by the motor angle detecting part 120a to the rotation information computing part 20 (S106).

Thus, the rotation information computing part 20 performs the computation process by using the motor rotation angle θ.

On the other hand, it is assumed that the frequency of CLK exceeds the operation guaranteed range of the PWM generating circuit 116 due to a failure of the vibrator 101. In this case, since the excitation of the resolver 17 cannot be normally performed, an abnormality occurs in the operation of the resolver 17. Here, it is assumed that the frequency of CLK does not exceed the operation guaranteed ranges of the AD converter 111 and the CPU 112, relating to the operation of the resolver diagnosis part 121. Accordingly, it is possible to normally operate the resolver diagnosis part 121. That is, in the CPU monitoring circuit 117, the failure of the resolver diagnosis part 121 is not detected.

The CPU 112 reads the resolver signal value Rd and the resolver excitation signal value Rgd from the AD converter 111, in the resolver diagnosis part 121 (S100), and carries out the first failure diagnosis process based on the read signal value (S102). Further, the CPU 112 diagnoses that the motor angle detecting part 120a (strictly, the resolver 17) has a failure (No in S104). The diagnosis result is input to the output selecting part 123.

Further, since the frequency of CLK does not exceed the operation guaranteed ranges of the AD converter 111 and the CPU 112, the motor diagnosis part 122 and the motor angle estimating part 120b can operate normally.

The CPU 112 reads the motor terminal voltage value Vmd and the motor current value Imod from the A/D converter 111, in the motor diagnosis part 122 (S108), and carries out the second failure diagnosis process based on the read value (S110). Further, the CPU 112 diagnoses that the motor angle estimating part 120b is normal (Yes in S112). The diagnosis result is input to the output selecting part 123.

Thus, the output selecting part 123 outputs the motor rotation angle θ' from the motor angle estimating part 120b, instead of the motor rotation angle θ from the motor angle detecting part 120a, to the rotation information computing part 20 (S114). In this way, it is possible to continue the control process by the output value of the motor angle estimating part 120b that is the alternative functional part.

Further, it is assumed that an abnormality occurs in the electric motor 12. In this case, the motor diagnosis part 122 diagnoses that the motor angle estimating part 120b has a failure (No in S112). When it is diagnosed that the motor angle estimating part 120b has a failure, the motor diagnosis part 122 transmits the failure detection signal Er to the failure handling part. Thus, the operation of the power steering apparatus is stopped.

On the other hand, it is assumed that the electric motor 12 is normal, and that the failure of the vibrator 101 is processed, and thus, the frequency of CLK exceeds the operation guaranteed ranges of the AD converter 111 and the CPU 112. In this case, the resolver diagnosis part 121 and the motor diagnosis part 122 cannot operate normally. In the present embodiment, in such a case, the CPU monitoring circuit 117 configured to be independent of the CPU 112 detects the occurrence of the failure of the CPU 112, and transmits the failure detection signal Er to the failure handling part. Thus, the operation of the electric power steering apparatus is stopped.

As described above, according to the electric power steering apparatus of the present embodiment, the functional part 120 relating to the drive-control of the electric motor 12 includes the main functional part 120a having the first function and the alternative functional part 120b having the second function that is the alternative of the first function. Further, there are provided the main function diagnosis part 121 that diagnoses the failure of the main functional part 120a and the alternative function diagnosis part 122 that diagnoses the failure of the alternative functional part 120b. Further, the main function diagnosis part 121 and the alternative function diagnosis part 122 are configured to have the operation guaranteed range wider than the operation guaranteed range of the main functional part 120a and the alternative functional part 120b. Further, when the main functional part 120a is diagnosed as a failure by the main function diagnosis part 121 and the alternative functional part 120b is diagnosed as normal by the alternative function diagnosis part 122, in the output selecting part 123, it is possible to output the output value from the alternative functional part 120b, instead of the output value from the main functional part 120a, to the control unit at the subsequent stage.

Thus, even though the main functional part 120a has a failure, it is possible to continue the control process by the alternative functional part 120b. In addition, even in the operational environment that exceeds the operation guaranteed range of the main functional part 120a and the alternative functional part 120b, when the operational environment is within the operation guaranteed range of the main function diagnosis part 121 and the alternative function diagnosis part 122, it is possible to accurately diagnose the failures of the main functional part 120a and the alternative functional part 120b.

Further, according to the electric power steering apparatus of the present embodiment, there is provided the failure monitoring part 117 that monitors the failures of the main function diagnosis part 121 and the alternative function diagnosis part 122. In addition, the failure monitoring part 117 is configured to have the operation guaranteed range wider than the operation guaranteed range of the main function diagnosis part 121 and the alternative function diagnosis part 122. Further, when the failure monitoring part 117 detects that a failure occurs in the main function diagnosis part 121 and the alternative function diagnosis part 122, it is possible to stop the operation of the electric power steering apparatus.

Thus, even in the operational environment that exceeds the operation guaranteed range of the main function diagnosis part 121 and the alternative function diagnosis part 122, when the operational environment is within the operation guaranteed range of the failure monitoring part 117, it is possible to accurately diagnose the failures of the main functional part 120a and the alternative functional part 120b, to thus stop the operation of the electric power steering apparatus.

Here, in the above description, the main functional part 120a corresponds to the main functional part, and the alternative functional part 120b corresponds to the alternative functional part. The main function diagnosis part 121 and the alternative function diagnosis part 122 correspond to the failure diagnosis part. The ECU 15 corresponds to an actuator control unit.

(Second Embodiment)

Next, a second embodiment of the present invention will be described with reference to the drawings. FIG. 10 to FIG. 18 are diagrams illustrating the second embodiment of the in-vehicle electric control apparatus according to the present invention.

(Configuration)

The present embodiment is different from the first embodiment in that an abnormal behavior reduction process is performed based on physical values used in the functional part relating to the drive-control of the electric motor 12 or physical values used in the sensors or the like that output the former physical values, in addition to the failure diagnosis process, in the failure diagnosis part (the main functional diagnosis part and the alternative functional diagnosis part) of the robust control unit in the first embodiment.

Here, as the physical values, for example, a power supply voltage of the steering torque sensor 14, a power supply voltage of the MCU 100, an operation clock frequency of the MCU 100, a detection value of each sensor and the like are used.

Specifically, the failure diagnosis part determines whether or not each physical value is a value exceeding a predetermined abnormality determination threshold value, or whether or not each physical value is a value exceeding a predetermined failure detection threshold value. Further, when it is determined that the physical value is the value exceeding the abnormality determination threshold value, the failure diagnosis part performs the abnormal behavior reduction process to be described later.

On the other hand, when it is determined that the physical value exceeds the failure detection threshold value, the failure diagnosis part outputs a diagnosis result indicating the failure.

Hereinafter, the same reference numerals are given to the same components as those in the first embodiment, and description thereof will be omitted. Description will be provided in detail for different parts.

Hereinafter, the failure detection threshold value and the abnormality determination threshold value will be described with reference to FIG. 10.

Figure 10A:
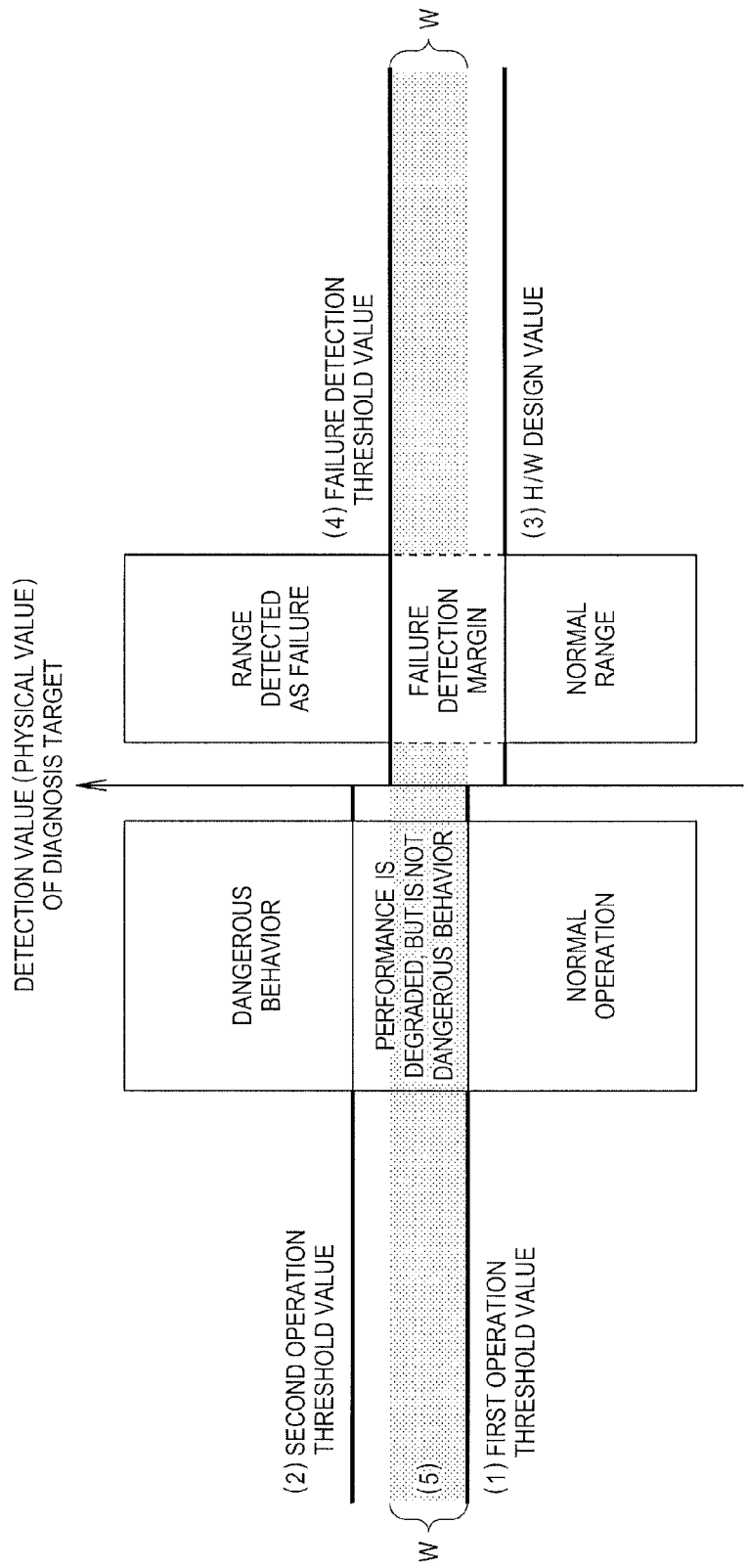
FIG. 10A is a diagram illustrating an example of a threshold value or the like relating to a failure diagnosis defined at a design stage and a product stage.
Figure 10B:
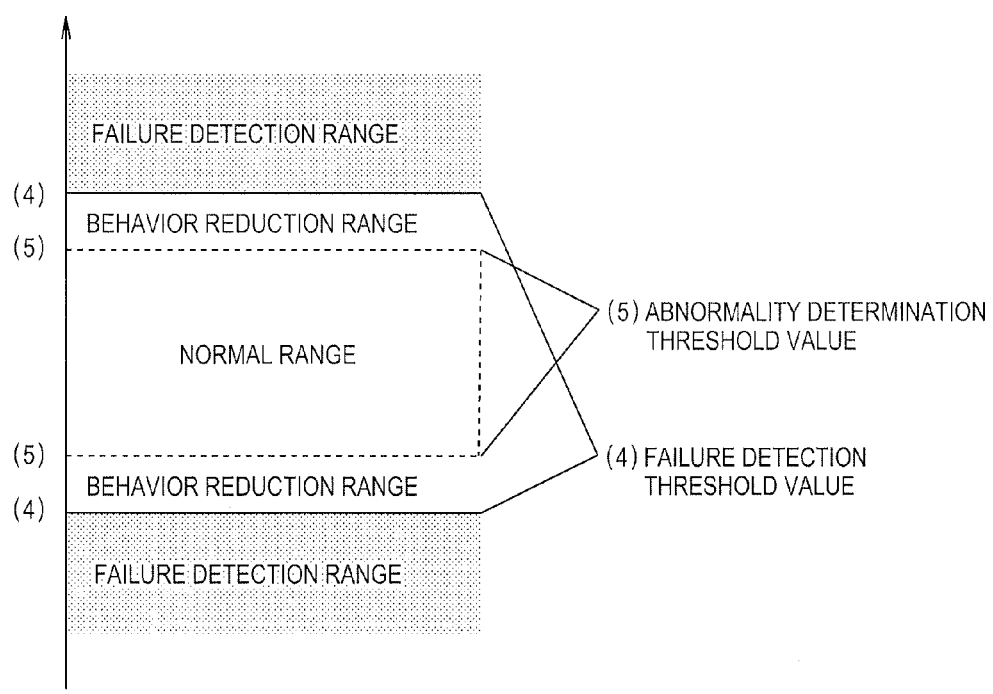
FIG. 10B is a diagram illustrating a setting example of a failure detection threshold value and an abnormality determination threshold value.

FIG. 10A is a diagram illustrating an example of threshold values or the like relating to a failure diagnosis defined at a design stage and a product stage, and FIG. 10B is a diagram illustrating a setting example of the failure detection threshold value and the abnormality determination threshold value.

First, four values of (1) to (4) illustrated in FIG. 10A are defined with respect to physical values (i.e., a power supply voltage Vts of the steering torque sensor 14, a power supply voltage Vcc of the MCU 100, an operation clock frequency CLK of the MCU 100, a detection value of each sensor, and the like) relating to respective functional parts relating to the drive-control of the electric motor 12. Here, the horizontal axis in FIG. 10 represents detection values (i.e., physical values) of a failure diagnosis target.

(1) A first operation threshold value represents a boundary value between a physical value in a normal operation range where a normal steering characteristic is obtained and a physical value in an operation range where the performance is degraded but a dangerous behavior is not present (i.e., operation range of an allowable steering behavior).

(2) A second operation threshold value represents a boundary value between the physical value in the operation range of the allowable steering behavior and a physical value in an operation range where the dangerous behavior is present.

(3) A hardware (H/W) design value represents a limit value that can be taken on design of H/W.

(4) A failure detection threshold value represents a boundary value between a predetermined failure detection margin value and a physical value in a failure detection range.

The above-mentioned values of (1) and (2) are values defined with respect to an actual product, and the above-mentioned values of (3) and (4) are values defined at a design stage of a product.

The failure detection margin is a margin provided for suppressing an erroneous detection of a failure.

It is preferable that a system be designed to satisfy the relationship of (2)>(4)>(1)>(3) or (3)>(1)>(4)>(2) in the respective values.

Here, when the failure detection threshold value is close to an H/W design value, the failure detection margin is reduced, which causes degradation in resistance to the erroneous detection. In order to prevent this problem, a high-accuracy component is necessary (i.e., cost increase). Further, contrarily, when the failure detection margin is increased, the failure detection performance is degraded. That is, the failure detection performance and the resistance to the erroneous detection have a trade-off relationship.

In the example of FIG. 10A, since the failure detection threshold value is set on the side of a normal value range of the physical value compared with the second operation threshold value, the physical value of the diagnosis target is detected as a failure in advance before entering a dangerous behavior area. On the other hand, when the failure detection threshold value is separated from the normal range compared with the second operation threshold value, there is a possibility that a dangerous behavior occurs in a borderline range where the physical value of the diagnosis target is not detected as a failure.

Thus, in the present embodiment, in the range of the failure detection margin, the abnormality determination threshold value is set in a range W illustrated in FIG. 10A. Further, with respect to the physical value exceeding the abnormality determination threshold value (hereinafter, referred to as an abnormal value), a process of reducing an abnormal behavior of steering generated by the abnormal value (i.e., abnormal behavior reduction process) is performed. That is, there is a possibility of entering the dangerous behavior area, but by detecting the abnormal value that is not detected as a failure by using the abnormality determination threshold value, a process of reducing the abnormal behavior is performed. Thus, it is possible to raise the second operation threshold value while maintaining the failure detection threshold value without change.

For example, as illustrated in FIG. 10B, the abnormality determination threshold value is set in a boundary between a behavior reduction range and a normal range, by using the failure detection margin as the behavior reduction range.

In the present embodiment, the failure diagnosis function and the abnormal behavior reduction function are applied to the main functional part that performs the process by using the detection value T of the steering torque sensor 14 and the main functional part that performs the process by using the motor rotation angle θ.

That is, the abnormal behavior reduction process is added to the first failure diagnosis process of the first embodiment.

Specifically, when it is determined that the power supply voltage Vts of the steering torque sensor 14 exceeds the abnormality determination threshold value (which is the abnormal value), the abnormal behavior reduction process is performed for the steering torque Td output from the A/D converter 111. Further, when it is determined that the frequency of the operation clock signal CLK of the MCU 100 is the abnormal value, the abnormal behavior reduction process is performed for the motor angular velocity ω computed by the motor angular velocity computing part 201.

Figure 11:
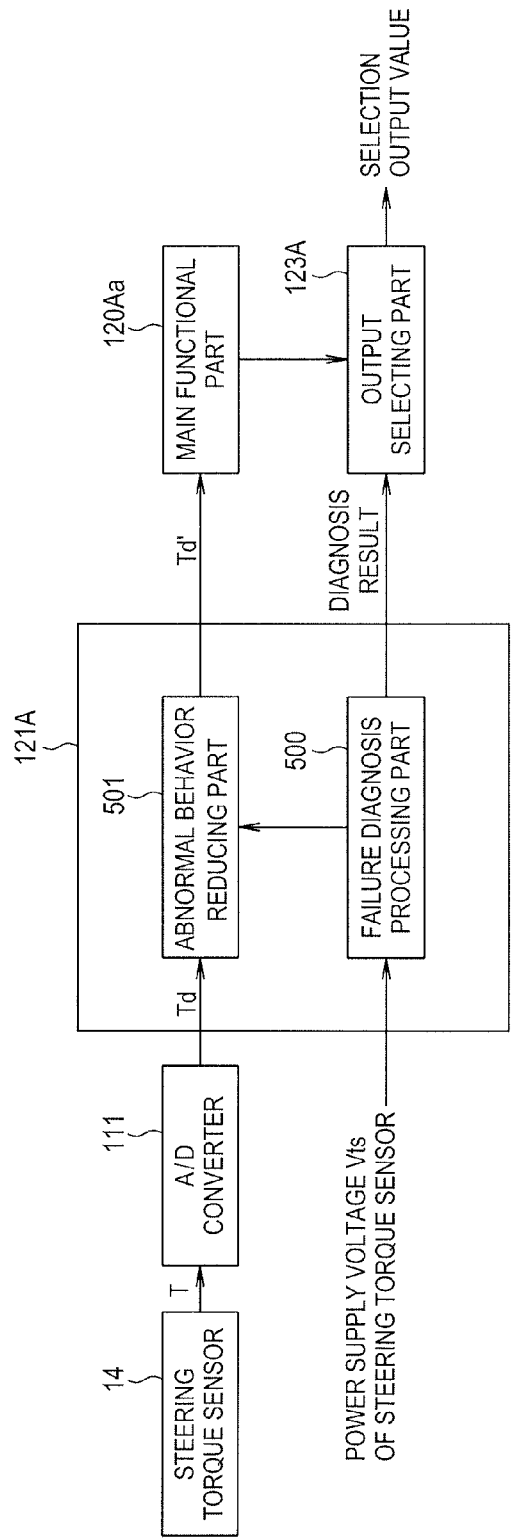
FIG. 11 is a block diagram illustrating an example of a specific configuration of a main function diagnosis part 121A.

FIG. 11 is a block diagram illustrating an example of a specific configuration of a main function diagnosis part 121A.

In the present embodiment, as illustrated in FIG. 11, the ECU 15 includes a main function diagnosis part 121A that diagnoses a failure of a main functional part (for example, the steering auxiliary torque command value computing part 21, the SAT estimation feedback part 23 or the like) 120Aa that performs a process by using the detection value T of the steering torque sensor 14 and performs the abnormal behavior reduction process for the torque detection value Td output from the A/D converter 111. In the present embodiment, the ECU 15 includes an alternative functional part 120Ab (not illustrated,) with respect to the main functional part 120Aa.

As illustrated in FIG. 11, the main function diagnosis part 121A includes a failure diagnosis processing part 500 and an abnormal behavior reducing part 501.

The failure diagnosis processing part 500 compares a torque sensor power supply voltage Vts that is the power supply voltage of the steering torque sensor 14 with a predetermined abnormality determination threshold value Thv1, and determines whether or not the torque sensor power supply voltage Vts exceeds the abnormality determination threshold value Thv1. Thus, when it is determined that the torque sensor power supply voltage Vts exceeds the abnormality determination threshold value Thv1, the failure diagnosis processing part 500 outputs a reduction command of the abnormal behavior to the abnormal behavior reducing part 501. On the other hand, when it is determined that the torque sensor power supply voltage Vts does not exceed the abnormality determination threshold value Thv1, the failure diagnosis processing part 500 outputs a normality notification to the abnormal behavior reducing part 501, and outputs a diagnosis result indicating the normality to an output selecting part 123A.

The failure diagnosis processing part 500 determines whether or not the torque sensor power supply voltage Vts exceeds a predetermined failure detection threshold value Thv1e. Thus, when it is determined that the torque sensor power supply voltage Vts exceeds the failure detection threshold value Thv1e, the failure diagnosis processing part 500 outputs a diagnosis result indicating the abnormality to the output selecting part 123A. On the other hand, when it is determined that the torque sensor power supply voltage Vts does not exceed the failure detection threshold value Thv1e, the failure diagnosis processing part 500 outputs a diagnosis result indicating the normality to the output selecting part 123A.

The abnormal behavior reducing part 501 performs, when receiving the reduction command from the failure diagnosis processing part 500, the abnormal behavior reduction process for the steering torque Td output from the A/D converter 111. Specifically, the abnormal behavior reducing part 501 corrects the steering torque Td so that the abnormal behavior of steering is reduced. As a correction method, for example, a method of limiting a maximum value of the steering torque Td, a method of adding an offset value to the steering torque Td, a method of multiplying the steering torque Td by a gain, or the like is used, for example.

The abnormal behavior reducing part 501 outputs a steering torque Td' in which the abnormal behavior reduction process is performed to the main functional part 120Aa. The abnormal behavior reducing part 501 outputs, when receiving the normality notification from the failure diagnosis processing part 500, Td'=Td to the main functional part 120Aa without correcting the steering torque Td output from the A/D converter 111.

Hereinafter, the failure diagnosis process and the abnormal behavior reduction process performed by the main function diagnosis part 121A are referred to as a failure diagnosis process A.

Figure 12:
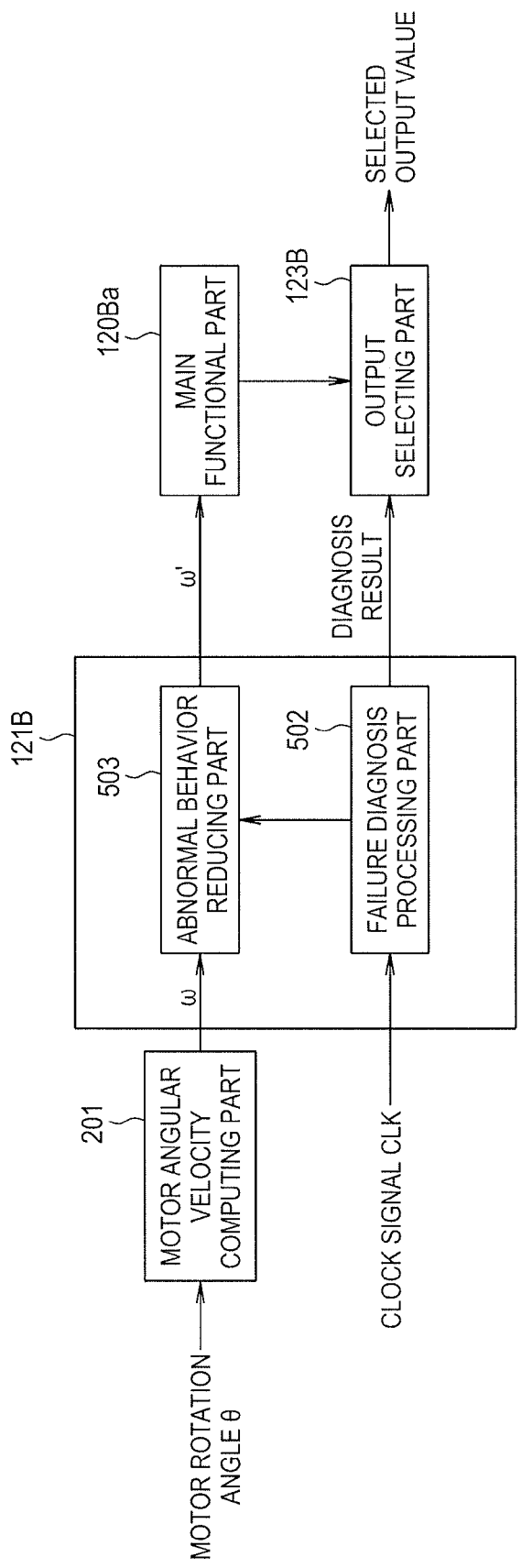
FIG. 12 is a block diagram illustrating an example of a specific configuration of a main function diagnosis part 121B.

Next, a configuration of a main function diagnosis part 121B will be described with reference to FIG. 12. FIG. 12 is a block diagram illustrating an example of a specific configuration of the main function diagnosis part 121B.

In the present embodiment, as illustrated in FIG. 12, the ECU 15 includes the main function diagnosis part 121B that diagnoses a failure of a main functional part 120Ba (for example, the torque command value compensating part 22, the SAT estimation feedback part 23, the counter electromotive voltage calculating part 25, the motor angular acceleration computing part 202 or the like) that is a main functional part operated by using the motor angular velocity ω and performs the abnormal behavior reduction process for the motor angular velocity ω output from the motor angular velocity computing part 201. In the present embodiment, the ECU 15 includes an alternative functional part 120Bb (not illustrated) with respect to the main functional part 120Ba.

As illustrated in FIG. 12, the main function diagnosis part 121B includes a failure diagnosis processing part 502 and an abnormal behavior reducing part 503.

Here, when the operation clock signal CLK of the MCU 100 is abnormal, a sampling frequency is changed, and thus, a control characteristic is changed. In particular, a control function having a phase advance characteristic or a phase delay characteristic is considerably affected. The motor angular velocity computing part 201 differentiates the motor rotation angle θ (or θ') detected by the motor rotation angle detecting part 120 to compute the motor angular velocity ω, and thus has a phase advance (differentiation). Thus, the motor angular velocity computing part 201 is considerably affected by the operation clock signal CLK.

The failure diagnosis processing part 502 reads the operation clock signal CLK of the MCU 100 (hereinafter, simply referred to as CLK) to detect the frequency of the CLK. In the present embodiment, a reference clock signal CLK generated by an external clock generator (i.e., vibrator 101) is read as CLK. Further, the failure diagnosis processing part 502 may be configured to be provided outside the MCU 100 to be independently operated.

The failure diagnosis processing part 502 compares a detected frequency f with an abnormality determination threshold value Thf, and determines whether or not the frequency f exceeds a predetermined abnormality determination threshold value Vtf. Thus, when it is determined that the frequency f exceeds the abnormality determination threshold value Vtf, the failure diagnosis processing part 502 outputs an abnormal behavior reduction command to the abnormal behavior reducing part 503. On the other hand, when it is determined that the frequency f does not exceed the abnormality determination threshold value Vtf, the failure diagnosis processing part 502 outputs a normality notification to the abnormal behavior reducing part 503, and outputs a diagnosis result indicating the normality to the output selecting part 123B.

The failure diagnosis processing part 502 also determines whether or not the frequency f exceeds a failure detection threshold value Vtfe. Thus, when it is determined that the frequency f exceeds the failure detection threshold value Vtfe, the failure diagnosis processing part 502 outputs a diagnosis result indicating the failure to the output selecting part 123B. On the other hand, when it is determined that the frequency f does not exceed the failure detection threshold value Vtfe, the failure diagnosis processing part 502 outputs a diagnosis result indicating the normality to the output selecting part 123B.

The abnormal behavior reducing part 503 performs, when receiving the reduction command from the failure diagnosis processing part 502, the abnormal behavior reduction process for the motor angular velocity ω output from the angular velocity computing part 210. Specifically, the abnormal behavior reducing part 503 corrects the motor angular velocity ω so that the abnormal behavior of steering is reduced. As a correction method, the same methods as in the case of the steering torque Td may be employed.

The abnormal behavior reducing part 503 outputs a motor angular velocity ω' in which the abnormal behavior reduction process is performed to the main functional part 120Ba. The abnormal behavior reducing part 503 outputs, when receiving the normality notification from the failure diagnosis processing part 502, ω'=ω to the main functional part 120Ba without correcting the motor angular velocity ω output from the angular velocity computing part 210.

Hereinafter, the failure diagnosis process and the abnormal behavior reduction process performed by the failure diagnosis processing part 502 and the abnormal behavior reducing part 503 are referred to as a failure diagnosis process B.

(Operation)

Next, an operation of the present embodiment will be described with reference to FIG. 13 to FIG. 18.

Figure 13:
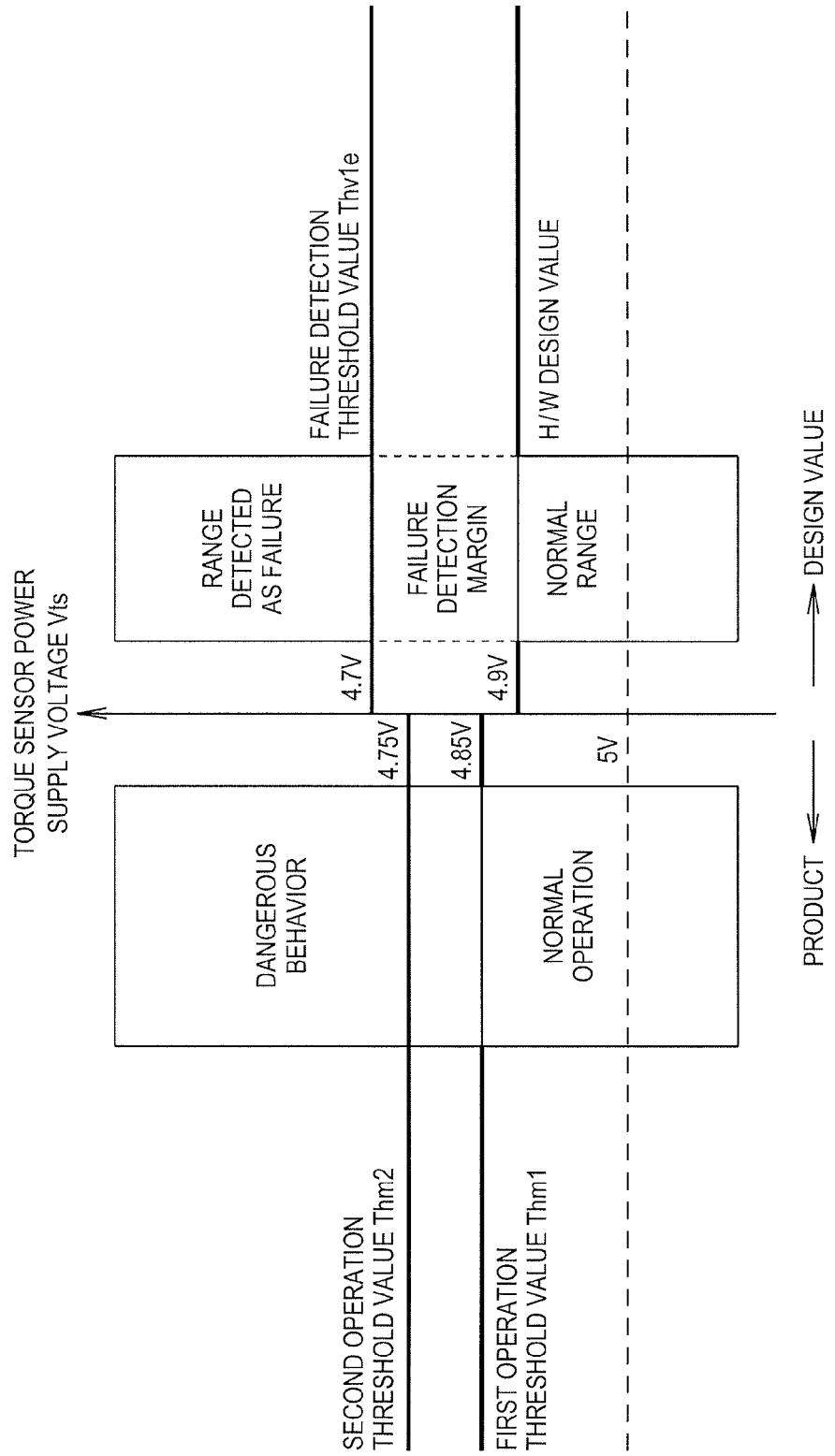
FIG. 13 is a diagram illustrating an example of the relationship between a second operation threshold value and a failure detection threshold value in a case where a dangerous behavior occurs when an abnormality closest to the failure detection threshold value occurs.
Figure 14:
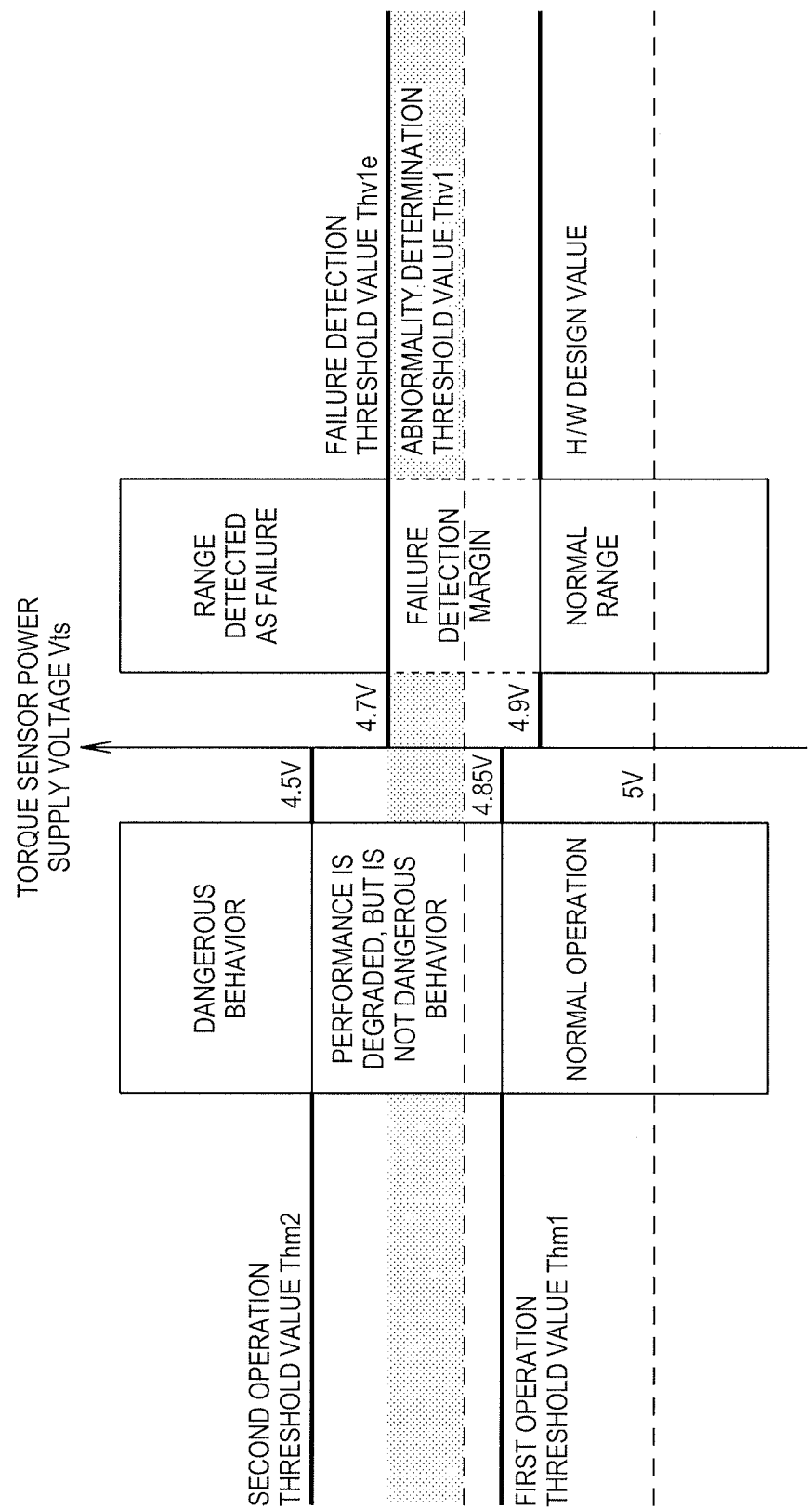
FIG. 14 is a diagram illustrating an example of the relationship of respective threshold values when an abnormal behavior reduction process is performed by setting an abnormality determination threshold value with respect to a torque sensor power supply voltage Vts.
Figure 15:
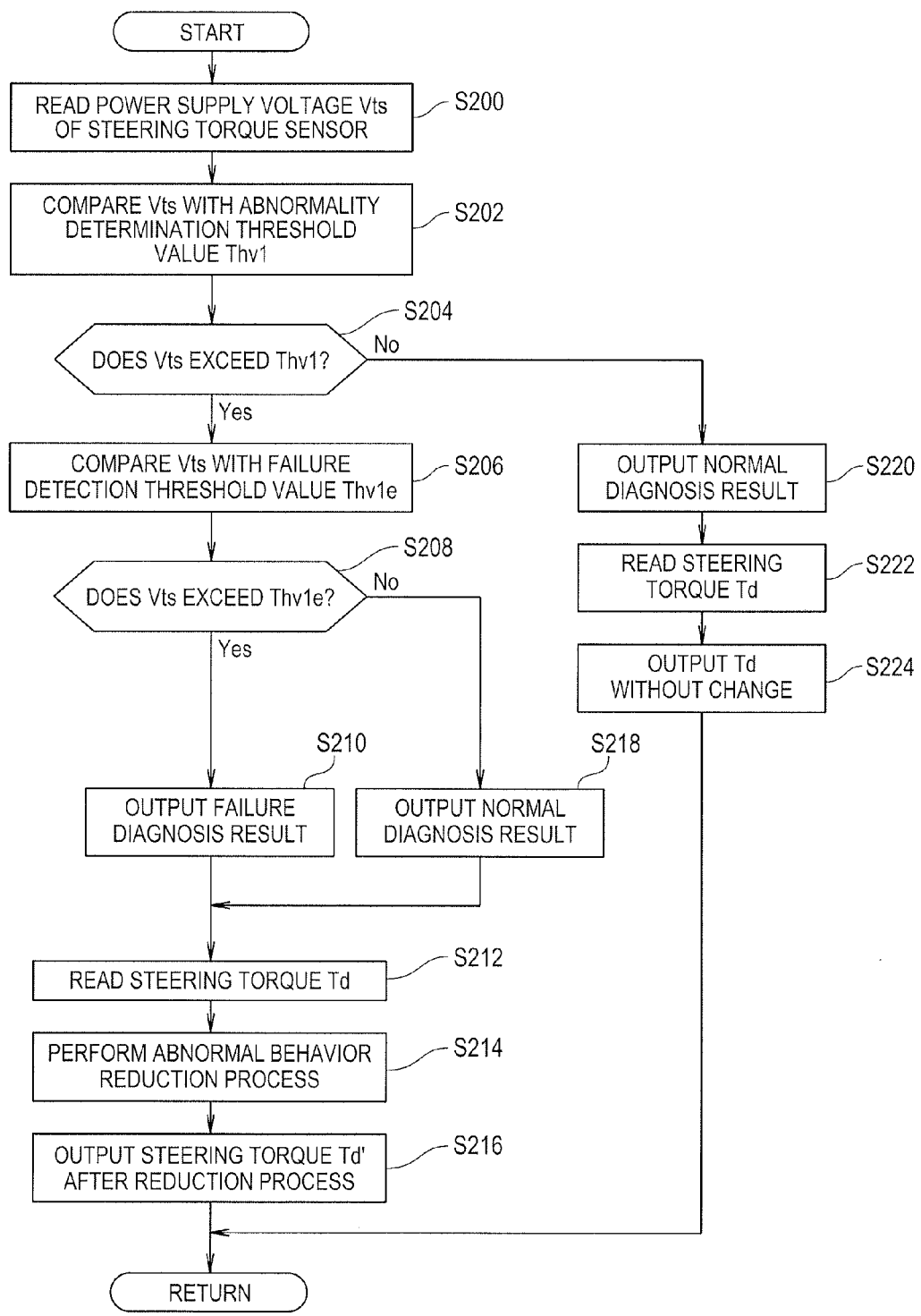
FIG. 15 is a flowchart illustrating an example of a processing procedure of a failure diagnosis process A.
Figure 16A:
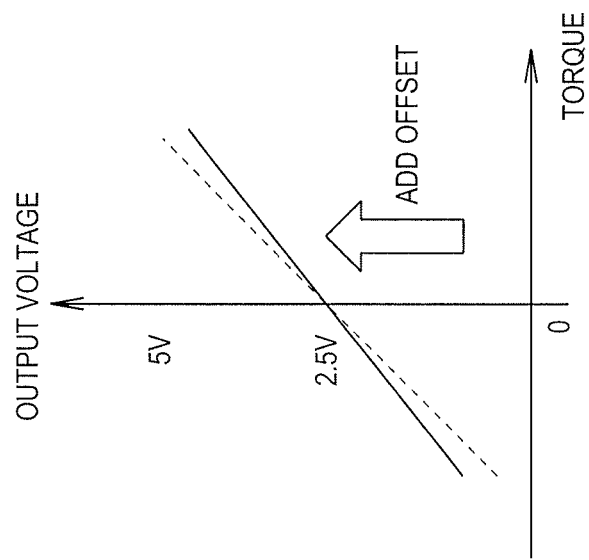
FIG. 16A is a diagram illustrating an example of an abnormality that occurs when the torque sensor power supply voltage Vts is reduced.
Figure 16B:
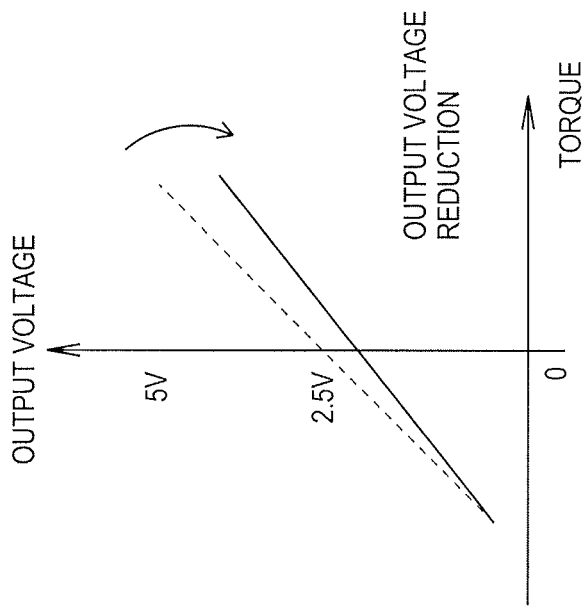
FIG. 16B is a diagram illustrating an example of the abnormal behavior reduction process performed for the abnormality in FIG. 16A.
Figure 17:
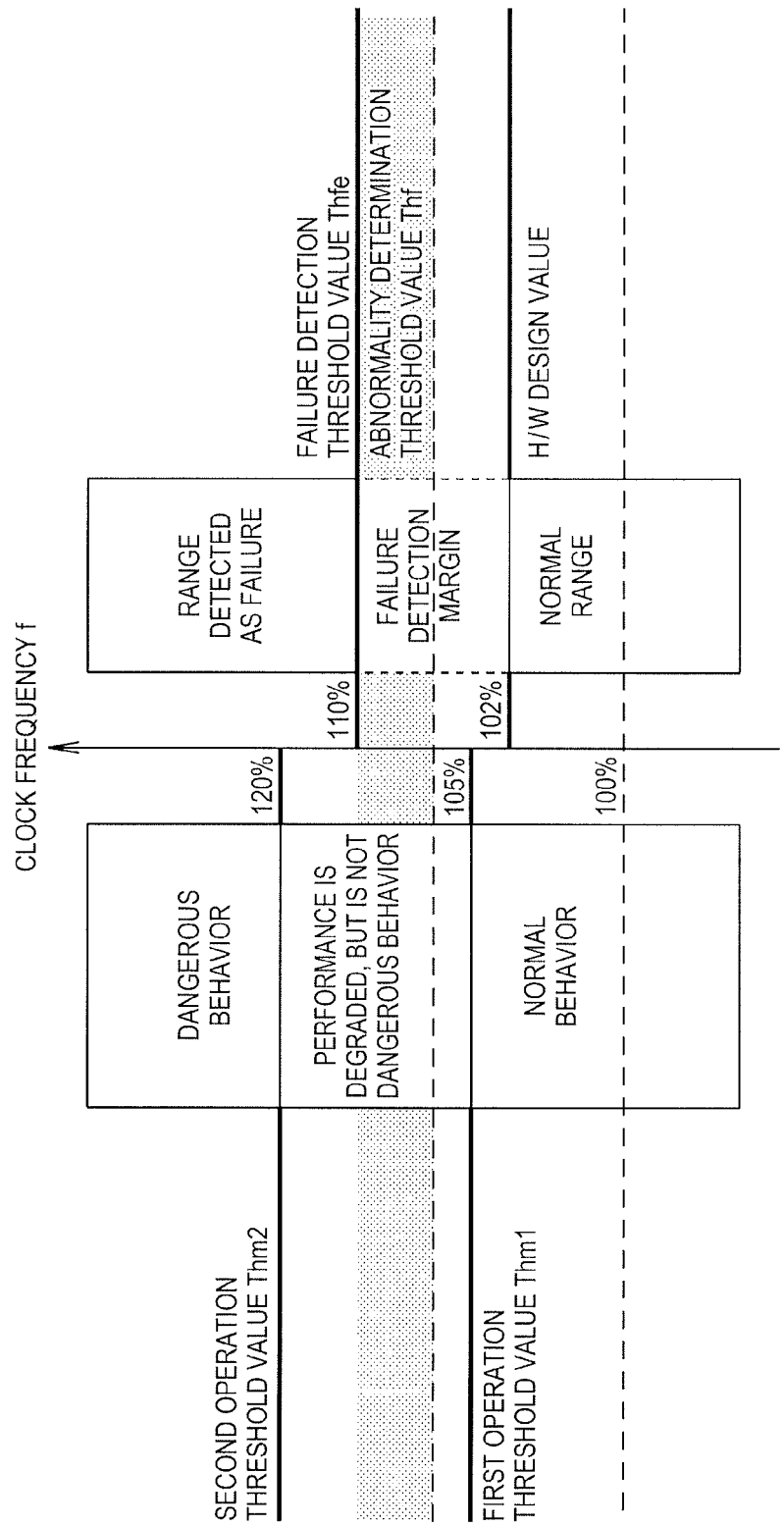
FIG. 17 is a diagram illustrating an example of the relationship of respective threshold values when the abnormal behavior reduction process is performed by setting the abnormality determination threshold value with respect to an operation clock frequency f.
Figure 18:
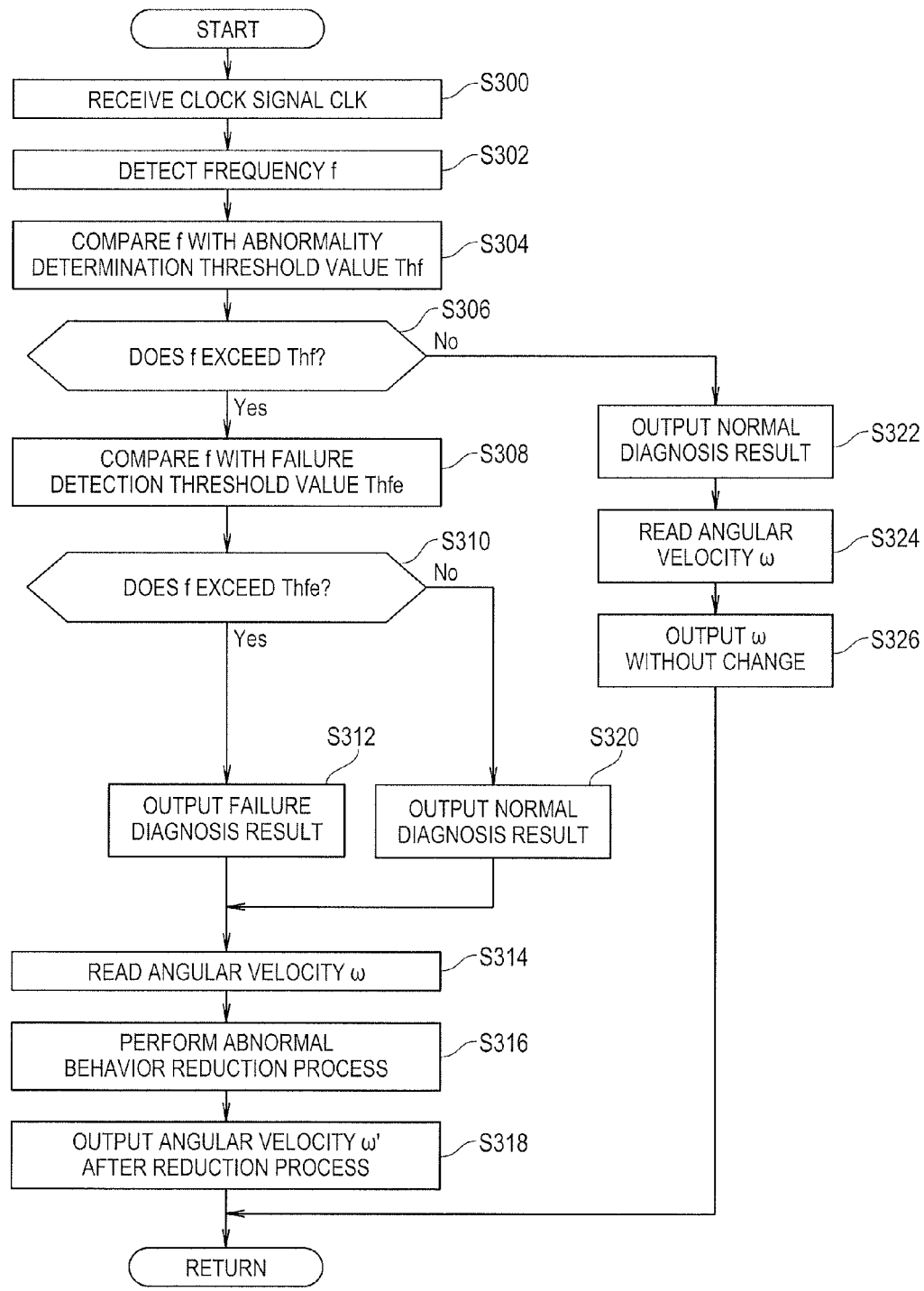
FIG. 18 is a flowchart illustrating an example of a processing procedure of a failure diagnosis process B.

FIG. 13 is a diagram illustrating an example of the relationship between a second operation threshold value and a failure detection threshold value in a case where a dangerous behavior occurs when an abnormality closest to the failure detection threshold value occurs. FIG. 14 is a diagram illustrating an example of the relationship of first and second operation threshold values, a H/W design value, an abnormality determination threshold value and a failure detection threshold value when the abnormal behavior reduction process is performed by setting an abnormality determination threshold value with respect to a torque sensor power supply voltage Vts. FIG. 15 is a flowchart illustrating an example of a processing procedure of the failure diagnosis process A with respect to a torque sensor power supply voltage value. FIG. 16A is a diagram illustrating an example of an abnormality that occurs when the torque sensor power supply voltage Vts is reduced, and FIG. 16B is a diagram illustrating an example of the abnormal behavior reduction process performed for the abnormality in FIG. 16A. FIG. 17 is a diagram illustrating an example of the relationship of first and second operation threshold values, a H/W design value, an abnormality determination threshold value and a failure detection threshold value when the abnormal behavior reduction process is performed by setting an abnormality determination threshold value with respect to an operation clock frequency f. FIG. 18 is a flowchart illustrating an example of a processing procedure of the failure diagnosis process B.

First, an operation of the failure diagnosis process A performed for the torque sensor power supply voltage Vts of the steering torque sensor 14 will be described.

Here, it is assumed that the above-mentioned values of (1) to (4) are set with respect to the torque sensor power supply voltage Vts of the steering torque sensor 14, in the relationship illustrated in FIG. 13, for example.

As illustrated in FIG. 13, at a design stage, a H/W design value is set to 4.9 V, and a failure detection threshold value Thv1e is set to 4.7 V. Further, in a product, a first operation threshold value Thm1 is set to 4.85 V, and a second operation threshold value Thm2 is set to 4.75 V.

Accordingly, when an abnormality (for example, 4.72 V) occurs immediately before the failure detection threshold value Thv1e, since the torque sensor power supply voltage Vts exceeds the second threshold value Thm2, the steering behavior enters a dangerous behavior area. Thus, there is a concern that a dangerous steering behavior may occur in a state where the failure is not detected.

Accordingly, here, as illustrated in FIG. 14, the abnormality determination threshold value Thv1 is set to 4.8 V.

It is assumed that, in the main function diagnosis part 121A, the failure diagnosis process A is carried out at a predetermined interrupt time. The failure diagnosis process A is started by carrying out a program of the failure diagnosis process A that is stored in advance in the ROM 113 in the CPU 112 of the MCU 100.

As illustrated in FIG. 15, firstly, the MCU 100 reads the torque sensor power supply voltage Vts to be supplied to the steering torque sensor 14 in the failure diagnosis processing part 500 (S200). For example, the MCU 100 reads the torque sensor power supply voltage Vts through a voltage detection circuit or the like. Here, for example, it is assumed that "Vts=4.95 V" is read. The failure diagnosis processing part 500 compares the read Vts (4.95 V) with the abnormality determination threshold value Thv1 (4.8 V) (S202). Since the dangerous behavior occurs as the torque sensor power supply voltage Vts is decreased with respect to a normal value (5 V), here, it is assumed that Vts exceeds Thv1 when Vts is lower than Thv1, and it is determined that Vts is an abnormal value. Similarly, it is assumed that Vts exceeds the failure detection threshold value Thv1e when Vts is lower than Thv1e, and it is determined that Vts is a value in a failure detection range.

When the torque sensor power supply voltage Vts is 4.95 V, since Vts is equal to or greater than Thv1 (4.8 V), the failure diagnosis processing part 500 determines that Vts does not exceed Thv1 (No in S204). Accordingly, the failure diagnosis processing part 500 outputs a normality notification to the abnormal behavior reducing part 501, and outputs a diagnosis result indicating the normality to the output selecting part 123A (S220).

Thus, the abnormal behavior reducing part 501 reads a steering torque Td output from the A/D converter 111 (S222), and outputs the read Td without change to the main functional part 120Aa as a steering torque Td' after the reduction process (S224).

On the other hand, when the read torque sensor power supply voltage Vts is 4.75 V, since Vts is lower than Thv1 (4.8 V), the failure diagnosis processing part 500 determines that Vts exceeds Thv1 (Yes in S204). Accordingly, the failure diagnosis processing part 500 compares the read torque sensor power supply voltage Thv1e (4.75 V) with the failure detection threshold value Vts (4.7 V) (S206). Since Vts is 4.75 V and Thv1e is 4.7 V, it is determined that Vts does not exceed Thv1e (No in S208). Thus, the failure diagnosis processing part 500 outputs a reduction command to the abnormal behavior reducing part 501, and outputs a diagnosis result indicating the normality to the output selecting part 123A (S218).

The abnormal behavior reducing part 501 reads the steering torque Td according to the reduction command from the failure diagnosis processing part 500 (S212), and performs the abnormal behavior reduction process for the read Td (S214).

Here, it is assumed that the steering torque sensor 14 outputs the range of the steering torque of "−10 Nm to +10 Nm" at "0 to 5 V". In this case, when the torque sensor power supply voltage Vts is reduced, as illustrated in FIG. 16A, a neutral point (0 Nm, 2.5 V) is deviated from. That is, even though the torque is not input, since a voltage lower than 2.5 V is detected, a negative torque is recognized.

Here, as illustrated in FIG. 16B, the abnormal behavior reducing part 501 adds a predetermined offset value to a digital value Td (hereinafter, simply referred to as a detection value Td) of the detection value T of the steering torque sensor 14 read from the A/D converter 111, to reduce the influence on the steering behavior due to an abnormal value. Instead of the addition of the offset value, the detection value Td may be multiplied by a predetermined gain to reduce the influence on the steering behavior due to the abnormal value. Alternatively, a restriction may be given to an upper limit of the steering torque Td, and when the steering torque Td exceeds the restriction value, the steering torque Td may be corrected to be equal to or lower than the restriction value to reduce the influence on the steering behavior due to the abnormal value.

With such a configuration, when the abnormal behavior reduction process is performed for the detection value Td, the abnormal behavior reducing part 501 outputs a steering torque Td' in which the reduction process is performed to the main functional part 120Aa (S216).

As the abnormal behavior reduction process is performed, as illustrated in FIG. 16, it is possible to decrease the second threshold value Tm2 from 4.75 V to 4.5 V without changing the failure detection threshold value Thv1e. That is, as the abnormal behavior reduction process is performed, it is possible to raise a limit value in which the dangerous behavior occurs.

Further, when the read torque sensor power supply voltage Vts is 4.68 V, since Vts is lower than Thv1 (4.8V), the failure diagnosis processing part 500 determines that Vts exceeds Thv1 (Yes in S204). Accordingly, the failure diagnosis processing part 500 compares Vts (4.68 V) with the failure detection threshold value Thv1e (4.7 V) (S206). Since the torque sensor power supply voltage Vts is 4.68 V and Thv1e is 4.7V, the failure diagnosis processing part 500 determines that Vts is lower than Thv1e (Yes in S208). Thus, the failure diagnosis processing part 500 outputs a diagnosis result indicating the failure to the output selecting part 123A, and outputs a reduction command to the abnormal behavior reducing part 501. A configuration in which the abnormal behavior reduction process is performed even though the failure is detected is used, but the present invention is not limited thereto. A configuration in which the abnormal behavior reduction process is not performed when the failure is detected may be used.

The abnormal behavior reducing part 501 reads the steering torque Td according to the reduction command from the failure diagnosis processing part 500 (S212), and performs the abnormal behavior reduction process for the read Td (S214). Further, the abnormal behavior reducing part 501 outputs the detection value Td' in which the abnormal behavior reduction process is performed to the main functional part 120Aa (S216).

Next, an operation of the failure diagnosis process B performed based on the operation clock frequency f of the MCU 100 will be described. Here, for example, at a design stage, a H/W design value is set to ±2%, and a failure detection threshold value Thfe is set to ±10%. Further, in a product, a first operation threshold value Thm1 is set to ±5%, and a second operation threshold value Thm2 is set to ±9%. For example, when the operation clock frequency is 100 MHz, the failure detection threshold value Thfe is set to 110 MHz and 90 MHz.

Specifically, on a side where the frequency is increased, at a design stage, the H/W design value is set to 102%, and the failure detection threshold value Thfe is set to 110%. Further, in a product, the first operation threshold value Thm1 is set to 105%, and the second operation threshold value Thm2 is set to 109%.

On the other hand, on a side where the frequency is decreased, at a design stage, the H/W design value is set to 98%, and the failure detection threshold value Thfe is set to 90%. Further, in a product, the first operation threshold value Thm1 is set to 95%, and the second operation threshold value Thm2 is set to 91%.

Accordingly, when an abnormality (for example, 109.5%) occurs immediately before the failure detection threshold value Thfe, since the clock frequency f exceeds the second threshold value Thm2, the steering behavior enters a dangerous behavior area. Thus, there is a concern that a dangerous steering behavior may occur in a state where the failure is not detected.

Accordingly, here, as illustrated in FIG. 14, the abnormality determination threshold value Thf is set to ±7%.

FIG. 17 is a diagram illustrating an example of the relationship of the above-mentioned values of (1) to (4) and an abnormality determination threshold value Vtf in the case of the side (positive side) where the frequency is increased.

In the example in FIG. 17, the abnormality determination threshold value Thf is set to 107%.

It is assumed that, in the main function diagnosis part 121B, the failure diagnosis process B is carried out at a predetermined interrupt time. The failure diagnosis process B is started by carrying out a program of the failure diagnosis process B that is stored in advance in the ROM 113 in the CPU 112 of the MCU 100.

As illustrated in FIG. 18, firstly, the MCU 100 reads the operation clock signal CLK supplied to the MCU 100 (S300), and detects the operation clock frequency f based on the read CLK (S302), in the failure diagnosis processing part 502. Here, for example, it is assumed that the operation clock signal CLK of 100% is 100 MHz and "f=106 MHz" is detected. The failure diagnosis processing part 502 compares "f=106 MHz" with the abnormality determination threshold value Thf (=107 MHz) (S304). Here, an abnormality determination threshold value on the side where the frequency f is increased is represented as Thfu, and an abnormality determination threshold value on the side where the frequency f is decreased is represented as Thfd. Similarly, a failure detection threshold value on the side where the frequency f is increased is represented as Thfue, and a failure detection threshold value on the side where the frequency f is decreased is represented as Thfde.

Further, when the frequency f exceeds Thfu, it is determined that the frequency f is an abnormal value. Further, when the frequency f is lower than Thfd, it is determined that the frequency f is an abnormal value. Similarly, when the frequency f exceeds the failure detection threshold value Thfue, it is determined that the frequency f is a value in a failure detection range. Further, when the frequency f is lower than the failure detection threshold value Thfde, it is determined that the frequency f is a value that falls within a failure detection range.

When the frequency f is 106 MHz, since the frequency f is equal to or lower than Thfu (107 MHz), the failure diagnosis processing part 500 determines that the frequency f does not exceed Thfu (No in S306). Accordingly, the failure diagnosis processing part 500 outputs a normality notification to the abnormal behavior reducing part 503, and outputs a diagnosis result indicating the normality to the output selecting part 123B (S322).

Thus, the abnormal behavior reducing part 503 reads the motor angular velocity ω output from the motor angular velocity computing part 201 (S324), and outputs the read ω without change to the main functional part 120Ba as the motor angular velocity ω' after the reduction process (S326).

On the other hand, when the detected frequency f is 108 MHz, since the frequency f exceeds Thfu (107 MHz), the failure diagnosis processing part 500 determines that the frequency f exceeds Thfu (Yes in S306). Accordingly, the failure diagnosis processing part 502 compares the frequency f (108 MHz) with the failure detection threshold value Thfue (110 MHz) (S308). Since the detected frequency f is 108 MHz and Thfue is 110 MHz, the failure diagnosis processing part 502 determines that the frequency f does not exceed Thfue (No in S310). Thus, the failure diagnosis processing part 502 outputs a reduction command to the abnormal behavior reducing part 503, and outputs a diagnosis result indicating the normality to the output selecting part 123B (S320).

The abnormal behavior reducing part 503 reads the motor angular velocity ω according to the reduction command from the failure diagnosis processing part 502 (S314), and performs the abnormal behavior reduction process for the read ω (S316).

Here, the abnormal behavior reducing part 503 multiplies the motor angular velocity ω by a predetermined gain to reduce the influence on the steering behavior due to the abnormal value. Here, the present invention is not limited to the configuration where the gain is multiplied, and a predetermined offset value may be added to the motor angular velocity ω to reduce the influence on the steering behavior due to the abnormal value.

With such a configuration, when the abnormal behavior reduction process is performed for the motor angular velocity ω, the abnormal behavior reducing part 503 outputs the motor angular velocity ω' in which the reduction process is performed to the main functional part 120Ba (S318).

By performing the abnormal behavior reduction process, as illustrated in FIG. 17, it is possible to raise the second operation threshold value Tm2 from 109% to 120% without changing the failure detection threshold value Thfue.

Further, when the detected frequency f is 111 MHz, since the frequency f exceeds Thfu (107 MHz), the failure diagnosis processing part 502 determines that the frequency f exceeds Thfu (Yes in S306). Accordingly, the failure diagnosis processing part 502 compares the frequency f (111 MHz) with the failure detection threshold value Thfue (110 MHz) (S308). Since the frequency f is 111 MHz and Thfue is 110 MHz, the failure diagnosis processing part 502 determines that the frequency f exceeds Thfue (Yes in S310). Thus, the failure diagnosis processing part 502 outputs a diagnosis result indicating the failure to the output selecting part 123B, and outputs a reduction command to the abnormal behavior reducing part 503 (S312). A configuration in which the abnormal behavior reduction process is performed even though the failure is detected is used, but the present invention is not limited thereto. A configuration in which the abnormal behavior reduction process is not performed when the failure is detected may be used.

The abnormal behavior reducing part 503 reads the motor angular velocity ω according to the reduction command from the failure diagnosis processing part 502 (S314), and performs the abnormal behavior reduction process for the read ω (S316). Further, the abnormal behavior reducing part 503 outputs the motor angular velocity ω' in which the abnormal reduction process is performed to the main functional part 120Ba (S318).

As described heretofore, according to the ECU 15 of the present embodiment, the abnormality determination threshold value is set in the failure detection margin, and set between the failure detection threshold value and the H/W design value. Further, by comparing the detected physical value (i.e., the torque sensor power supply voltage Vts and the operation clock frequency f) with the abnormality determination threshold value, it is determined whether or not the physical value is an abnormal value. Further, when it is determined that the physical value is the abnormal value, the process of reducing the abnormal behavior of steering generated by the abnormal value is performed. Specifically, when the physical value is the torque sensor power supply voltage Vts, the predetermined offset value is added to the steering torque Td output from the A/D converter 111. Further, when the physical value is the operation clock frequency f, the motor angular velocity ω output from the motor angular velocity computing part 201 is multiplied by the predetermined gain.

Thus, when the physical value is the abnormal value in a borderline range where the failure is not detected, since the abnormal behavior can be reduced, it is possible to substantially raise the second operation threshold value. That is, it is possible to raise a limit value in which a dangerous behavior occurs, without addition of an expensive component and without reduction in the failure detection margin.

Here, in the above description, the failure diagnosis processing parts 500 and 502 constitute a failure diagnosis part and an abnormality determining part. The abnormal behavior reducing parts 501 and 503 constitute an abnormal behavior reducing part.

(Third Embodiment)

Next, a third embodiment of the present invention will be described with reference to the drawings. FIG. 19 to FIG. 23 are diagrams illustrating the third embodiment of an in-vehicle electronic control apparatus according to the present invention.

(Configuration)

The present embodiment is different from the above-described second embodiment in that a main function diagnosis part 121C is provided at a subsequent stage to the steering auxiliary torque command value computing part 21 (hereinafter, referred to as a main functional part 120Ca) that is a main functional part that performs its process by using the detection value of the steering torque sensor 14, and in that the steering auxiliary torque command value Iref, instead of the steering torque Td, is used as a correction target. Further, the present embodiment is different from the above-described embodiments in that a main function diagnosis part 121D is provided at a subsequent stage to the PWM control unit 243 (hereinafter, referred to as a main functional part 120Da) that is a main functional part, and in that a pulse width modulation signal Du output from the PWM control unit 243 is corrected to reduce an abnormal behavior.

Hereinafter, the same reference numerals are given to the same components as those in the above-described respective embodiments, and description thereof will be omitted. Description will be provided in detail for different parts.

Figure 19:
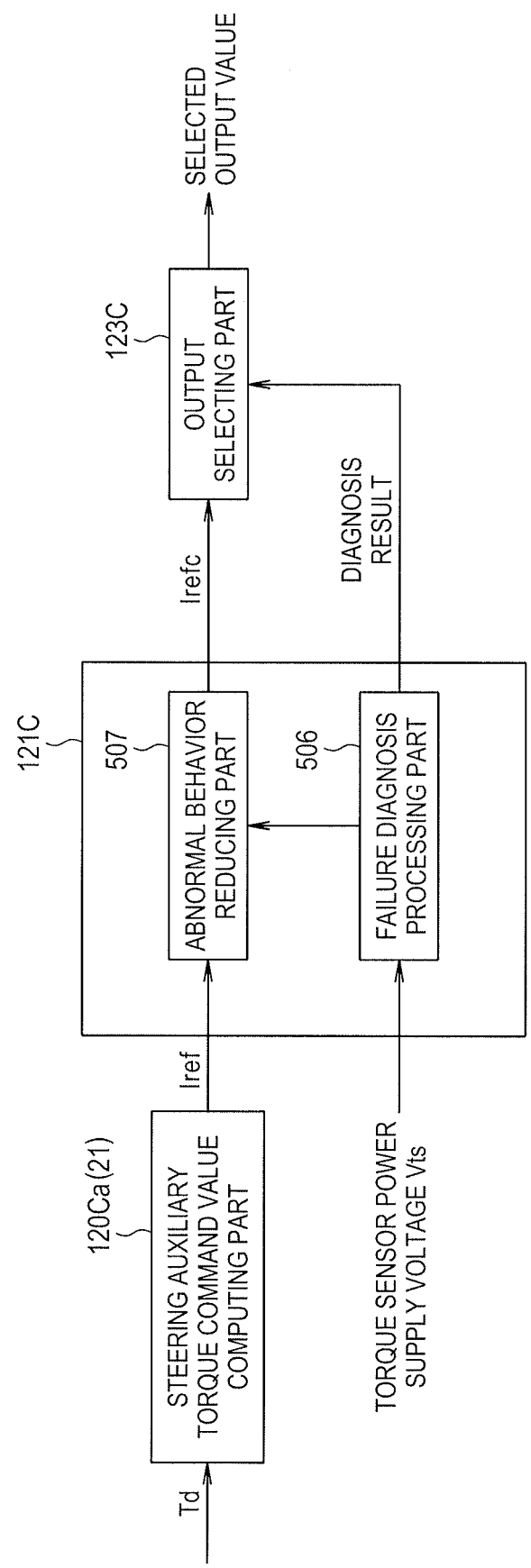
FIG. 19 is a block diagram illustrating an example of a specific configuration of a main function diagnosis part 121C.
Figure 20:
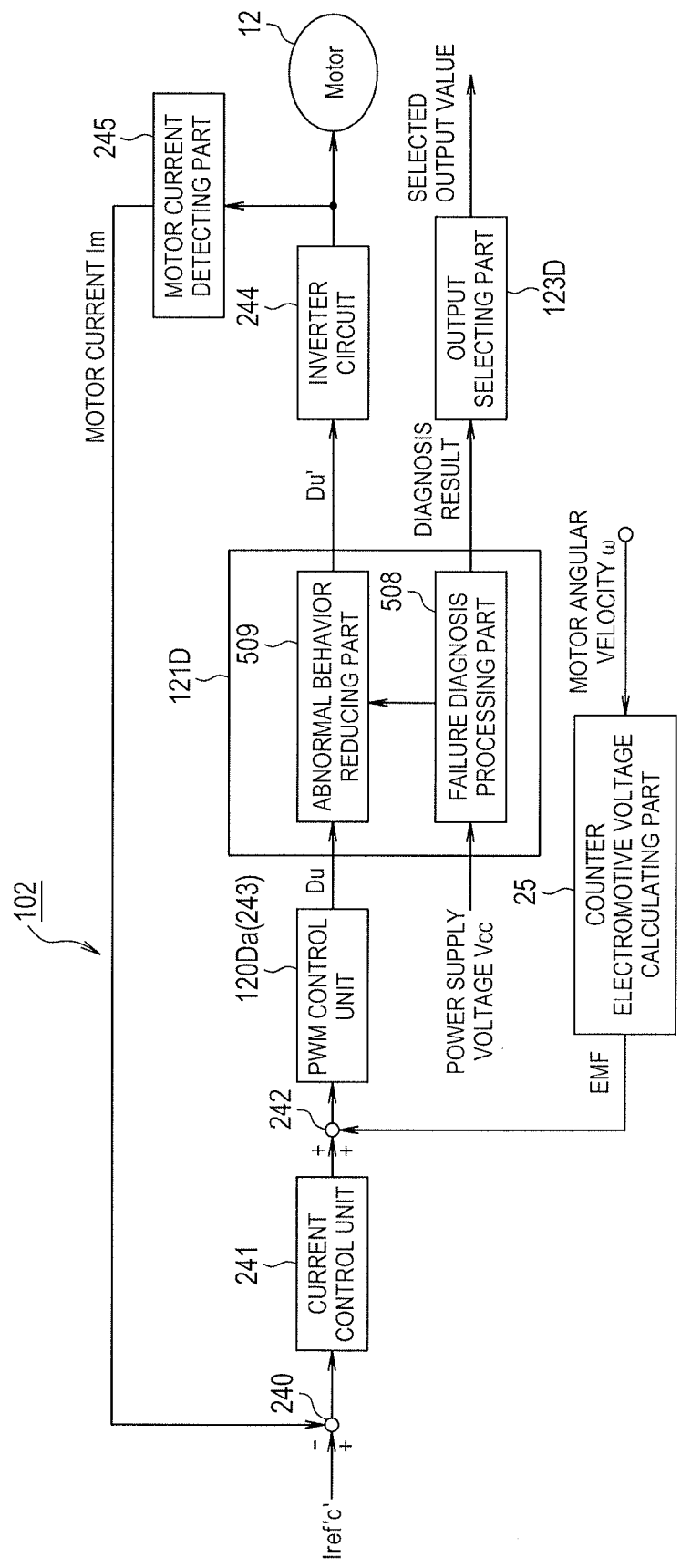
FIG. 20 is a block diagram illustrating an example of a specific configuration of a main function diagnosis part 121D.

Here, FIG. 19 is a block diagram illustrating an example of a specific configuration of the main function diagnosis part 121C. FIG. 20 is a block diagram illustrating an example of a specific configuration of the motor drive circuit 102 of the present embodiment.

In the present embodiment, the ECU 15 includes the main function diagnosis part 121C that diagnoses a failure of the main functional part 120Ca (i.e., the steering auxiliary torque command value computing part 21), and performs the abnormal behavior reduction process for an output value of the main functional part 120Ca. In the present embodiment, the ECU 15 includes an alternative functional part 120Cb (not illustrated) with respect to the main functional part 120Ca. The main function diagnosis part 121C is provided at a subsequent stage to the main functional part 120Ca, as illustrated in FIG. 19.

Further, as illustrated in FIG. 19, the main function diagnosis part 121C includes a failure diagnosis processing part 506 and an abnormal behavior reducing part 507.

Since the failure diagnosis processing part 506 has the same configuration as the failure diagnosis processing part 500 of the second embodiment, description thereof will be omitted. The failure diagnosis processing part 506 outputs the diagnosis result to an output selecting part 123C.

The abnormal behavior reducing part 507 performs, when receiving a reduction command from the failure diagnosis processing part 506, the abnormal behavior reduction process for a steering auxiliary torque command value Iref output from the main functional part 120Ca. Specifically, the abnormal behavior reducing part 507 corrects the steering auxiliary torque command value Iref so that the abnormal behavior of steering is reduced. As a correction method, for example, a method of limiting a maximum value of the steering auxiliary torque command value Iref, a method of adding an offset value to the steering auxiliary torque command value Iref, a method of multiplying the steering auxiliary torque command value Iref by a gain, or the like is used.

The abnormal behavior reducing part 507 outputs a steering auxiliary torque command value Irefc in which the abnormal behavior reduction process is performed to the output selecting part 123C. The abnormal behavior reducing part 507 outputs, when receiving a normality notification from the failure diagnosis processing part 506, Irefc=Iref to the output selecting part 123C, without correcting the steering auxiliary torque command value Iref output from the main functional part 120Ca.

Hereinafter, the failure diagnosis process and the abnormal behavior reduction process performed by the main function diagnosis part 121C of the present embodiment are referred to as a failure diagnosis process C.

Next, a detailed configuration of the motor drive circuit 102 of the present embodiment will be described.

As illustrated in FIG. 20, the motor drive circuit 102 of the present embodiment includes a main function diagnosis part 121D that diagnoses a failure of a main functional part 120Da (i.e., the PWM control unit 243) and performs the abnormal behavior reduction process for an output value of the main functional part 120Da. In the present embodiment, the motor drive circuit 102 includes an alternative functional part 120Db, not illustrated, with respect to the main functional part 120Da.

As illustrated in FIG. 20, the main function diagnosis part 121D includes a failure diagnosis processing part 508 and an abnormal behavior reducing part 509. Further, the abnormal behavior reducing part 509 is provided between the main functional part 120Da and an output selecting part 123D, as illustrated in FIG. 20.

Here, a power supply voltage Vcc supplied to the MCU 100 included in the ECU 15 (hereinafter, referred to as a power supply voltage Vcc) is also used as a reference voltage of an A/D converter (for example, the A/D converter 111) included in the ECU 15. Accordingly, deviation of the power supply voltage Vcc has an influence on deviation of all output values of the A/D converter.

Further, as a function that is susceptible to being affected by the deviation of the power supply voltage Vcc of the MCU 100, there is a counter electromotive voltage compensation. The counter electromotive voltage compensation is performed by adding a counter electromotive voltage EMF calculated by the counter electromotive voltage calculating part 25 to a voltage command value Vref. Thus, a compensated voltage command value Vref' is calculated. The compensated voltage command value Vref' is divided by a voltage applied to an inverter circuit 244 in the PWM control unit 243 to be converted into a PWM duty cycle. The PWM control unit 243 generates a pulse modulation signal Du based on the PWM duty cycle.

Accordingly, when the power supply voltage Vcc is higher than a normal value, an inverter voltage is detected to be low, and the PWM duty cycle is increased. Thus, an assist extreme state occurs.

The failure diagnosis processing part 508 compares the Vcc that is the power supply voltage of the MCU 100 with a predetermined abnormality determination threshold value Thv2, and determines whether or not the power supply voltage Vcc exceeds the abnormal determination threshold value Thv2. In the present embodiment, the failure diagnosis processing part 508 may be configured to receive an input of another reference voltage generated from the outside as the power supply voltage Vcc, as an alternative of the power supply voltage Vcc. Alternatively, the failure diagnosis processing part 508 may be configured to independently operate outside the MCU 100. In this configuration, the abnormal behavior reducing part 509 receives a diagnosis result from the failure diagnosis processing part 508 on the outside to perform the abnormal behavior reduction process.

When it is determined that the power supply voltage Vcc exceeds the abnormality determination threshold value Thv2, the failure diagnosis processing part 508 outputs an abnormal behavior reduction command to the abnormal behavior reducing part 509. On the other hand, when it is determined that the power supply voltage Vcc does not exceed the abnormality determination threshold value Thv2, the failure diagnosis processing part 508 outputs a normality notification to the abnormal behavior reducing part 509, and outputs a diagnosis result indicating the normality to an output selecting part 123D, not illustrated.

Further, the failure diagnosis processing part 508 determines whether or not the power supply voltage Vcc exceeds a predetermined failure detection threshold value Thv2e. Thus, when it is determined that the power supply voltage Vcc exceeds the failure detection threshold value Thv2e, the failure diagnosis processing part 508 outputs a diagnosis result indicating the failure to the output selecting part 123D.

The abnormal behavior reducing part 509 performs, when receiving the reduction command from the main function diagnosis part 121C, the abnormal behavior reduction process for a pulse modulation signal Du output from the main functional part 120Da. Specifically, the abnormal behavior reducing part 509 corrects the pulse modulation signal Du so that an abnormal behavior of steering is reduced. As a correction method, for example, a method of multiplying the pulse modulation signal Du by a gain may be used.

The abnormal behavior reducing part 509 outputs a pulse modulation signal Du' in which the abnormal behavior reduction process is performed to the output selecting part 123D. The abnormal behavior reducing part 509 outputs, when receiving a normality notification from the main function diagnosis part 121C, Du'=Du to the output selecting part 123D, without correcting the pulse modulation signal Du output from the main functional part 120Da.

Hereinafter, the failure diagnosis process and the abnormal behavior reduction process performed by the main function diagnosis part 121C and the abnormal behavior reducing part 509 of the present embodiment are referred to as a failure diagnosis process D.

(Operation)

Next, an operation of the present embodiment will be described with reference to FIG. 21 to FIG. 23.

Figure 21:
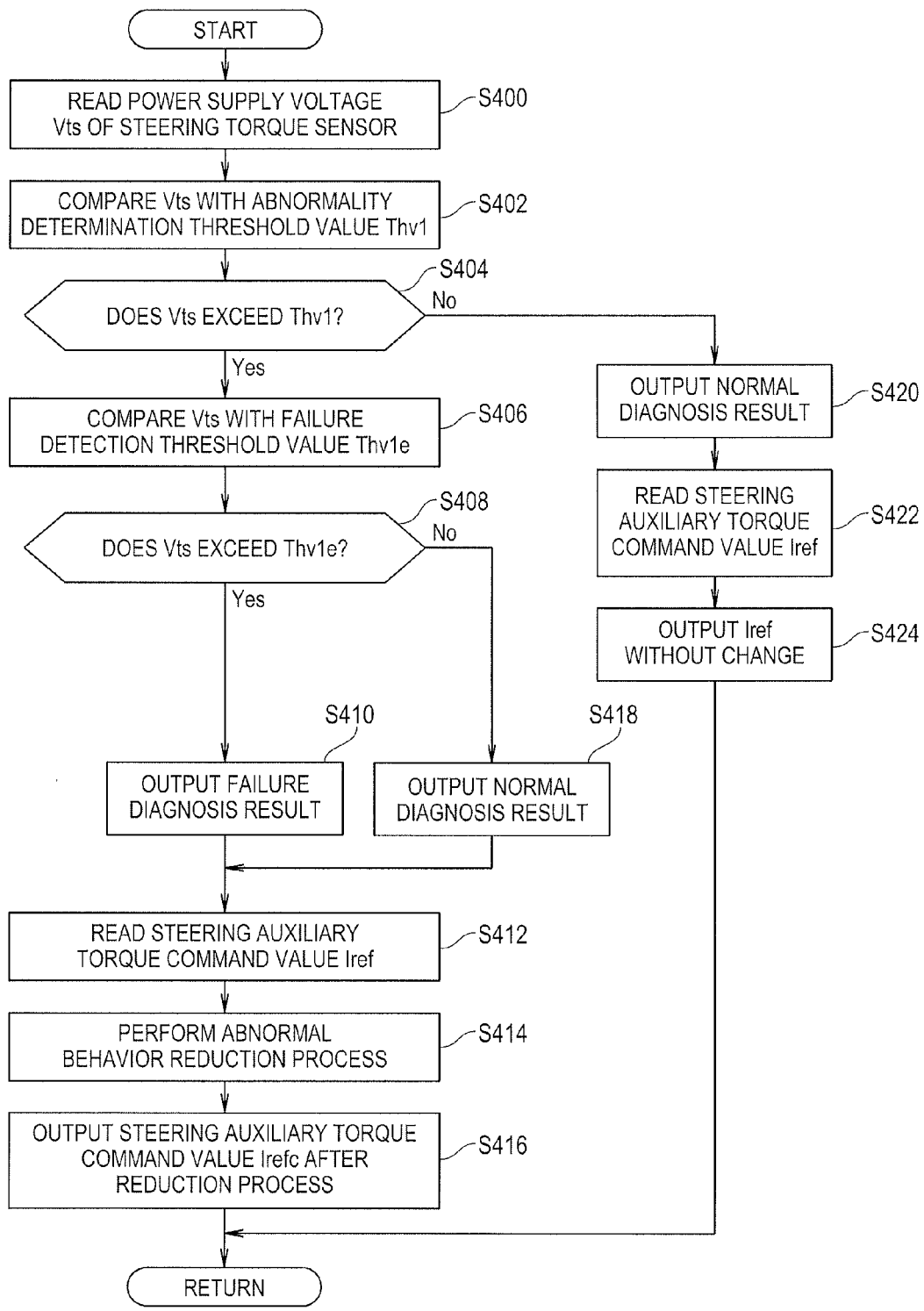
FIG. 21 is a flowchart illustrating an example of a processing procedure of a failure diagnosis process C.

Here, FIG. 21 is a flowchart illustrating an example of a processing procedure of the failure diagnosis process C. FIG. 22 is a diagram illustrating an example of the relationship of first and second operation threshold values, a H/W design value, an abnormality determination threshold value and a failure detection threshold value when the abnormal behavior reduction process is performed by setting the abnormality determination threshold value for a power supply voltage Vcc. FIG. 23 is a flowchart illustrating an example of a processing procedure of the failure diagnosis process D.

First, the operation of the failure diagnosis process C will be described.

Here, the operation of the failure diagnosis process C is the same as the failure diagnosis process A of the first embodiment in the setting content of the first and second operation threshold values, the H/W design value, the failure detection threshold value and the abnormality determination threshold value Thv1, and is different only in a target on which the abnormal behavior reduction process is performed. Further, the operation content thereof is partially the same as in the operation of the failure diagnosis process A of the first embodiment. Hereinafter, only different points will be described in detail.

It is assumed that, in the main function diagnosis part 121C, the failure diagnosis process C is carried out at a predetermined interrupt time. The failure diagnosis process Cis started by carrying out a program of the failure diagnosis process C that is stored in advance in the ROM 113 in the CPU 112 of the MCU 100.

Here, since processes of steps S400 to S410 are the same as the processes of steps S200 to S210 performed by the failure diagnosis processing part 500 of the first embodiment, description thereof will be omitted.

First, it is assumed that the MCU 100 determines that the torque sensor power supply voltage Vts does not exceed the abnormality determination threshold value Thv1 in the failure diagnosis processing part 506, outputs a normality notification to the abnormal behavior reducing part 507, and outputs a diagnosis result indicating the normality to the output selecting part 123C (S420).

In this case, the abnormal behavior reducing part 507 reads a steering auxiliary torque command value Iref output from the main functional part 120Ca according to the normality notification from the failure diagnosis processing part 506 (S422), and outputs the read Iref without change to the output selecting part 123C as a steering auxiliary torque command value Irefc after the reduction process (S424).

Next, it is assumed that the MCU 100 determines that the torque sensor power supply voltage Vts exceeds the abnormality determination threshold value Thv1 in the failure diagnosis processing part 506 (Yes in S404), determines that Vts does not exceed the failure detection threshold value Thv1e (No in S408), outputs a reduction command to the abnormal behavior reducing part 507, and outputs a diagnosis result indicating the normality to the output selecting part 123C (S418).

The abnormal behavior reducing part 507 reads the steering auxiliary torque command value Iref according to the reduction command from the failure diagnosis processing part 506 (S412), and performs the abnormal behavior reduction process for the read Iref (S414).

Here, the abnormal behavior reducing part 507 multiplies the steering auxiliary torque command value Iref by a predetermined gain, to reduce the influence on the steering behavior due to an abnormal value. Instead of the gain multiplication method, the methods as described in the second embodiment may be used.

As described above, when the abnormal behavior reduction process is performed for the steering auxiliary torque command value Iref, the abnormal behavior reducing part 507 outputs a steering auxiliary torque command value Irefc in which the reduction process is performed to the output selecting part 123C (S416).

By performing the abnormal behavior reduction process, it is possible to raise the second operation threshold value Tm2 without changing the failure detection threshold value Thv1e. That is, by performing the abnormal behavior reduction process, it is possible to raise a limit value in which a dangerous behavior occurs.

Further, it is assumed that, in the failure diagnosis processing part 506, it is determined that the torque sensor power supply voltage Vts exceeds the abnormality determination threshold value Thv1 (Yes in S404) and it is determined that Vts exceeds the failure detection threshold value Thv1e (Yes in S408).

Thus, the failure diagnosis processing part 506 outputs the diagnosis result indicating the failure to the output selecting part 123C, and outputs the reduction command to the abnormal behavior reducing part 507 (S410). A configuration in which the abnormal behavior reduction process is performed even though the failure is detected is used, but the present invention is not limited thereto. A configuration in which the abnormal behavior reduction process is not performed when even though the failure is detected may be used.

The abnormal behavior reducing part 507 reads the steering auxiliary torque command value Iref according to the reduction command from the failure diagnosis processing part 506 (S412), and performs the abnormal behavior reduction process for the read Iref (S414). Further, the steering auxiliary torque command value Irefc in which the abnormal reduction process is performed is output to the output selecting part 123C (S416).

Here, the operation of the failure diagnosis process D will be described.

Here, for example, at a design stage, a H/W design value is set to ±2%, and a failure detection threshold value Thv2e is set to ±20%. Further, in a product, a first operation threshold value Thm1 is set to ±5%, and a second operation threshold value Thm2 is set to ±15%. For example, when the power supply voltage Vcc is 5 V, the failure detection threshold value Thv2e is set to 6 V and 4 V.

Specifically, on a side where the voltage is increased, at a design stage, the H/W design value is set to 5.1 V, and the failure detection threshold value Thv2e is set to 6 V. Further, in a product, the first operation threshold value Thm1 is set to 5.25 V, and the second operation threshold value Thm2 is set to 5.75 V.

On the other hand, on a side where the voltage is decreased, at a design stage, the H/W design value is set to 4.9 V, and the failure detection threshold value Thv2e is set to 4 V. Further, in a product, the first operation threshold value Thm1 is set to 4.75V, and the second operation threshold value Thm2 is set to 4.25 V.

Accordingly, an assist extreme state of about 20% occurs before the failure is detected. Thus, here, in order to suppress this variable width, the abnormality determination threshold value Thv2 is set to 5.5 V on the side where the voltage is increased, and is set to 4.5 V on the side where the voltage is decreased.

Figure 22:
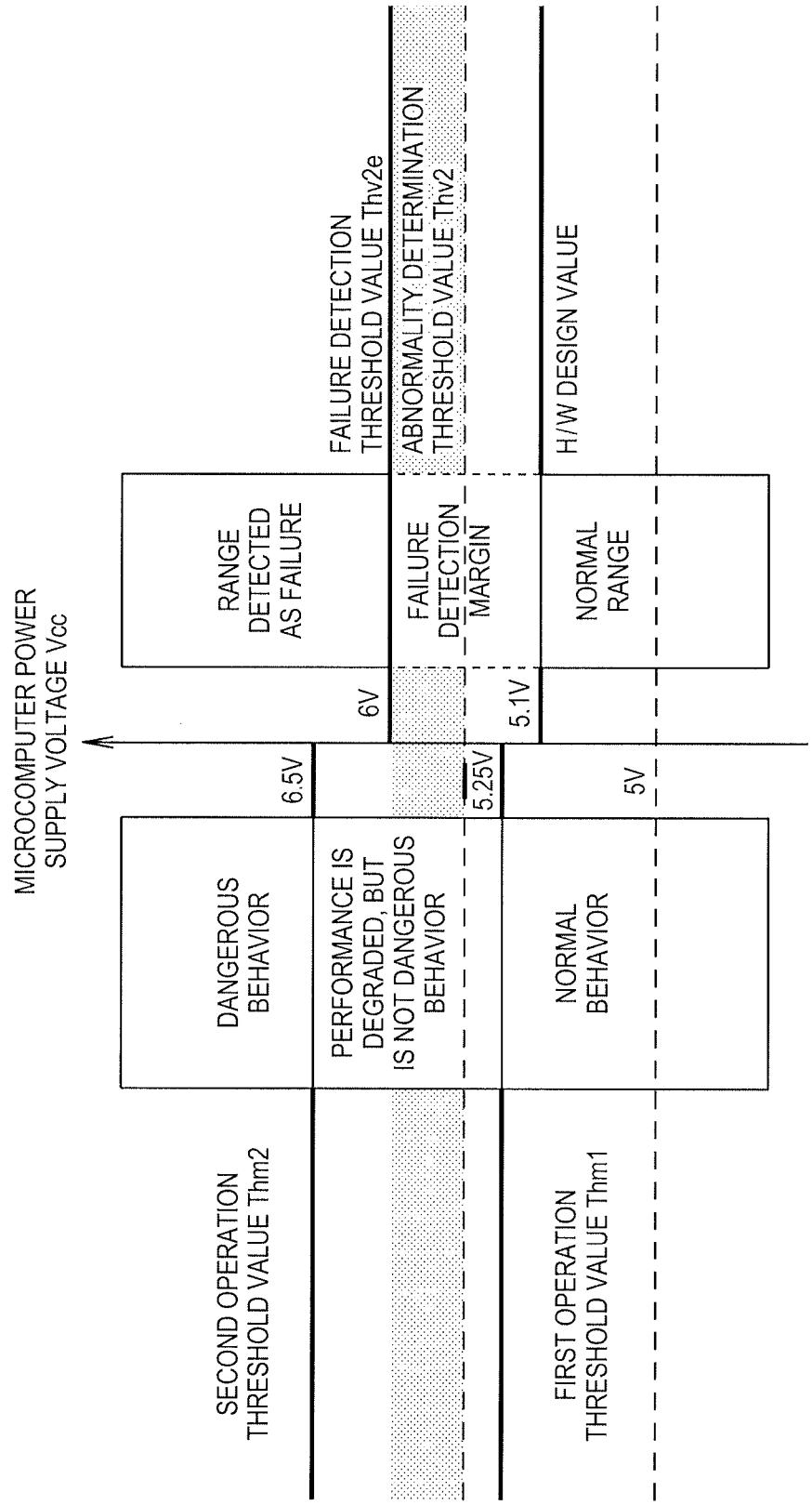
FIG. 22 is a diagram illustrating an example of the relationship of respective threshold values when the abnormal behavior reduction process is performed by setting the abnormality determination threshold value with respect to a power supply voltage Vcc.
Figure 23:
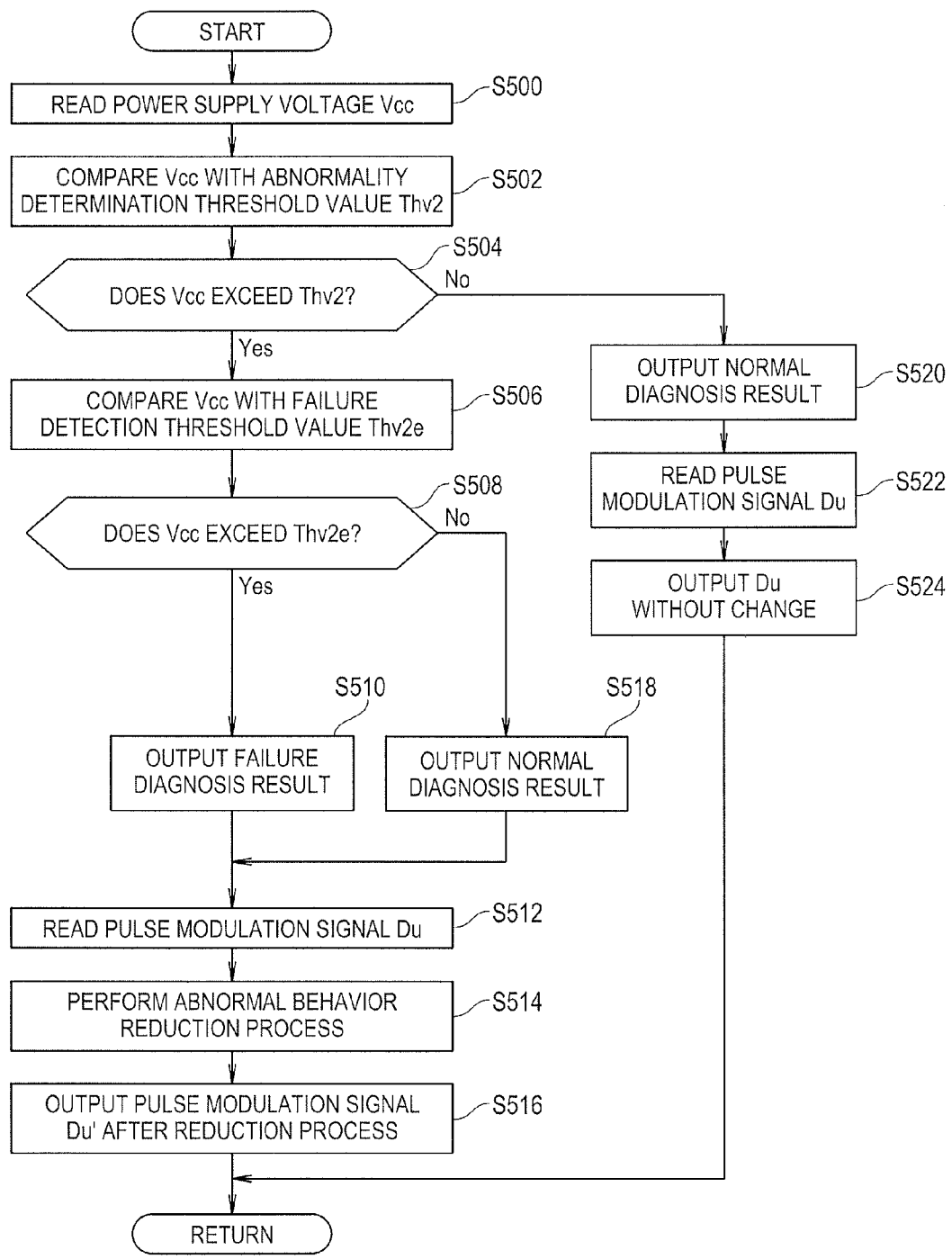
FIG. 23 is a flowchart illustrating an example of a processing procedure of a failure diagnosis process D.

FIG. 22 is a diagram illustrating an example of the relationship of the above-mentioned values of (1) to (4) and the abnormality determination threshold value Thv2 in the case of the side (positive side) where the voltage is increased.

Here, it is assumed that, in the main function diagnosis part 121D, the failure diagnosis process D is carried out at a predetermined interrupt time. The failure diagnosis process D is started by carrying out a program of the failure diagnosis process D that is stored in advance in the ROM 113 in the CPU 112 of the MCU 100.

The abnormal behavior processing part 508 reads a reference voltage value from the outside as the power supply voltage Vcc (S500). Here, for example, it is assumed that "Vcc=5.25 V" is read. The failure diagnosis processing part 508 compares the read Vcc (5.25 V) with an abnormality determination threshold value Thv2 (5.5V) (S502). Since the power supply voltage Vcc is increased with respect to a normal value (5 V), a possibility that a dangerous behavior occurs is increased, here, when Vcc exceeds Thv2, it is determined that Vcc is an abnormal value. Similarly, when Vcc is lower than the failure detection threshold value Thv2e, it is assumed that Vcc exceeds Thv2e, and it is assumed that Vcc is a value in a failure detection range.

When the power supply voltage Vcc is 5.25 V, since Vcc is equal to or lower than Thv2 (5.5V), the failure diagnosis processing part 508 determines that Vcc does not exceed Thv2 (No in S504). Accordingly, the failure diagnosis processing part 508 outputs a normality notification to the abnormal behavior reducing part 509, and outputs a diagnosis result indicating the normality to the output selecting part 123D (S520).

Thus, the abnormal behavior reducing part 509 reads the pulse modulation signal Du output from the main functional part 120Da (PWM control unit 243) (S522), and then outputs the read Du without change to the output selecting part 123D as the pulse modulation signal Du' after the reduction process (S524).

On the other hand, when the read power supply voltage value Vcc is 5.75 V, since Vcc exceeds Thv2 (5.5V), the failure diagnosis processing part 508 determines that Vcc exceeds Thv2 (Yes in S504). Accordingly, the failure diagnosis processing part 508 compares the power supply voltage Vcc (5.75 V) with a failure detection threshold value Thv2e (6 V) (S506). Since Vcc is 5.75 V and Thv2e is 6 V, the failure diagnosis processing part 508 determines that Vcc does not exceed Thv2e (No in S508). Thus, the failure diagnosis processing part 508 outputs a reduction command to the abnormal behavior reducing part 509, and outputs a diagnosis result indicating the normality to the output selecting part 123D (S518).

In this case, the abnormal behavior reducing part 509 reads the pulse modulation signal Du according to the reduction command from the main function diagnosis part 121C (S512), and performs the abnormal behavior reduction process for the read Du (S514).

Here, the abnormal behavior reducing part 509 multiplies the pulse modulation signal Du read from the main functional part 120Da by a predetermined gain to reduce the influence on the steering behavior due to the abnormal value. Here, the present invention is not limited to the gain multiplication method, and the other methods as described in the second embodiment may be used.

In this manner, when the abnormal behavior reduction process is performed for the pulse modulation signal Du, the abnormal behavior reducing part 509 outputs a pulse modulation signal Du' in which the reduction process is performed to the output selecting part 123D (S516).

By performing the abnormal behavior reduction process, as illustrated in FIG. 22, it is possible to raise the second operation threshold value Thm2 from 5.75 V to 6.5 V, without changing the failure detection threshold value Thv2e. That is, by performing the abnormal behavior reduction process, it is possible to raise a limit value in which a dangerous behavior occurs.

In addition, when the power supply voltage Vcc is 6.1 V, since Vcc exceeds Thv2 (5.5 V), the failure diagnosis processing part 508 determines that Vcc exceeds Thv2 (Yes in S504). Accordingly, the failure diagnosis processing part 508 compares Vcc (6.1 V) with the failure detection threshold value Thv2e (6 V) (S506). Since the power supply voltage Vcc is 6.1 V and Thv2e is 6 V, the failure diagnosis processing part 508 determines that Vcc is lower than Thv2e (Yes in S508). Thus, the failure diagnosis processing part 508 outputs a diagnosis result indicating the failure to the output selecting part 123D, and outputs a reduction command to the abnormal behavior reducing part 509 (S510). A configuration in which the abnormal behavior reduction process is performed even though the failure is detected is used, but the present invention is not limited thereto. A configuration in which the abnormal behavior reduction process is not performed when the failure is detected may be used.

The abnormal behavior reducing part 509 reads the steering torque Td according to the reduction command from the failure diagnosis processing part 508 (S512), and performs the abnormal behavior reduction process for the read Td (S514). Further, the abnormal behavior reducing part 509 outputs a detection value Td' in which the abnormal behavior reduction process is performed to the output selecting part 123D (S516).

As described heretofore, according to the ECU 15 of the present embodiment, the abnormality determination threshold value is set in the failure detection margin set between the failure detection threshold value and the H/W design value. Further, by comparing the detected physical value (i.e., the torque sensor power supply voltage Vts and the operation clock frequency f) with the abnormality determination threshold value, it is determined whether or not the physical value is an abnormal value. Further, when it is determined that the physical value is the abnormal value, the process of reducing the abnormal behavior of steering generated by the abnormal value is performed. Specifically, when the physical value is the torque sensor power supply voltage Vts, the steering auxiliary torque command value Iref output from the main functional part 120Ca (i.e., the steering auxiliary torque command value computing part 21) is multiplied by a preset gain. Further, when the physical value is the power supply voltage Vcc, the pulse modulation signal Du output from the main functional part 120Da (i.e., the PWM control unit 243) is multiplied by a preset gain.

Thus, when the physical value is the abnormal value in a borderline range where the failure is not detected, it is possible to reduce the abnormal behavior, and thus, it is possible to substantially extend the second operation threshold value. That is, it is possible to extend a limit value in which a dangerous behavior occurs without addition of an expensive component and without reduction in the failure detection margin.

Here, in the above description, the failure diagnosis processing parts 506 and 508 form a failure diagnosis part and an abnormality determining part. The abnormal behavior reducing parts 507 and 509 form an abnormal behavior reducing part.

MODIFICATION EXAMPLES (1) In the above-described second and third embodiments, the configuration in which the failure diagnosis process and the abnormal behavior reduction process are performed for the robust control unit having the main functional part and the alternative functional part is used, but the present invention is not limited thereto. A configuration in which the failure diagnosis process and the abnormal behavior reduction process are performed for a functional part that includes only the main functional part may be used.

(2) In the above-described second and third embodiments, the configuration in which the failure diagnosis process and the abnormal behavior reduction process are performed for the main functional parts Aa and Ca that perform the process by using the detection value T of the steering torque sensor 14, the main functional part Ba that performs the process by using the motor rotation angle and the main functional part 120Da that performs the process by using the compensated voltage command value Vref' calculated by performing the counter electromotive voltage compensation is used, but the present invention is not limited thereto.

For example, the failure diagnosis process and the abnormal behavior reduction process may be configure to perform for a different main functional part such as the motor angle detecting part 120*a* that detects the motor rotation angle θ by using the resolver output signal value Rd of the first embodiment.

(3) In the above-described second embodiment, the configuration in which the failure diagnosis process A is performed based on the power supply voltage Vts of the steering torque sensor 14 is used, but the present invention is not limited thereto. A configuration in which the failure of the main functional part 120Aa is diagnosed based on the power supply voltage Vcc that is the reference voltage of the A/D converter 111 and the abnormal behavior reduction process is performed for the output value Td of the A/D converter 111 may be used. In this case, the processing content is the same except that the power supply voltage Vts is changed to the power supply voltage Vcc in the failure diagnosis process A.

(4) In the above-described second embodiment, the configuration in which the abnormal behavior reduction process is performed for the motor angular velocity ω that is the output value of the motor angular velocity computing part 201 that is the main functional part having the phase advance characteristic is used, but the present invention is not limited thereto. For example, when the main functional part performs a phase delay characteristic (i.e., integral operation), the abnormal behavior reduction process may be configured to performe for an output value of the main functional part.

(5) In the above-described embodiments, the configuration in which the processes performed by the respective failure diagnosis parts are realized by carrying out an exclusive program in the CPU 112 of the MCU 100 is used, but the present invention is not limited thereto. A part or all of the respective failure diagnosis parts may be configured with hardware. In particular, since the abnormal behavior reducing part performs the correction of each reduction target by the addition of the offset value, the multiplication of the gain or the like, a hardware configuration is easily achieved. This is similarly applied to the functions of the rotation information computing part 20, the steering auxiliary torque command value computing part 21, the torque command value compensating part 22, the SAT estimation feedback part 23, the counter electromotive voltage calculating part 25 and the motor drive circuit 102, the entirety of which may be configured with hardware, or may be processed by software.

(6) In the above-described embodiment, the examples in which the in-vehicle electronic control apparatus according to the present invention is applied to the electric power steering apparatus have been described, but the present invention is not limited thereto. An in-vehicle mechanism part may be applied to a different apparatus, when it is an apparatus that performs drive-control by using an actuator.

Further, in the above-described embodiments, the preferred specific examples of the present invention are given various limits that are technically preferable, but the scope of the present invention is not limited thereto as long as there is no particular limitation to the present invention in the above description. Further, the drawings used for the above description are schematic diagrams having a horizontal and vertical scale of members or parts different from a real scale thereof, for ease of illustration.

Further, the present invention is not limited to the above-described embodiments, and includes modifications, improvements, equivalents or the like in a range capable of achieving the objects of the present invention.

The present application claims priority from Japanese Patent Application No. 2012-199619 filed on Sep. 11, 2012, the content of which is hereby incorporated by reference into this application.

Hereinbefore, the description is provided with reference to the limited number of embodiments, but the technical scope of the present invention is not limited thereto. It will be obvious to those skilled in the art that modifications of the respective embodiments can be made based on the above disclosure.

REFERENCE SIGNS LIST

SM steering mechanism
1 steering wheel
2 steering shaft
2a input shaft
2b output shaft
3 steering column
4, 6 universal joint
5 intermediate shaft
8 steering gear mechanism
9 tie rod
WL, WR turning wheels
10 steering auxiliary mechanism
11 speed reduction mechanism
12 electric motor
14 steering torque sensor
15 ECU
16 speed sensor
20 rotation information computing part
25 counter electromotive voltage calculating part
201 motor angular velocity computing part
202 motor angular acceleration computing part
21 steering auxiliary torque command value computing part
22 command value compensating part
23 sat estimation feedback part
100 MCU
101 vibrator
102 motor drive circuit
110 input interface
111 A/D converter
112 CPU
113 ROM
114 RAM
115 output interface
116 PWM generation circuit
120 functional part
120a, 120Aa to 120 Da main functional part
120b alternative functional part
121, 121A TO 121D main function diagnosis part
122 alternative function diagnosis part
123, 123A TO 123D output selecting part
240 subtraction part
241 current control unit
242 adder part
243 PWM control unit
244 inverter circuit
245 motor current detecting part
312 phase compensating part
313 center responsiveness improving part
314 adder part
43 convergence compensating part
44 inertia compensating part
45, 46 adder part
500, 502, 506, 508 failure diagnosis part
501, 503, 507, 509 abnormal behavior reducing part

The invention claimed is:

1. An in-vehicle electronic control apparatus comprising:
an actuator configured to generate a drive force to be given to an operation mechanism of an in-vehicle apparatus;
an actuator control unit configured to drive-control the actuator;
a main functional part having a first function that is a function relating to the drive-control of the actuator;
an alternative functional part having a second function that is an alternative function of the first function;
a main function diagnosis part configured to diagnose a normality or a failure of the main functional part, and
an alternative function diagnosis part configured to diagnose the normality or the failure of the alternative functional part,
wherein when the main function diagnosis part diagnoses that the main functional part is normal, the actuator control unit performs a first control process by use of a first output value from the main functional part to drive-control the actuator,
wherein when the main function diagnosis part diagnoses that the main functional part has the failure and the alternative function diagnosis part diagnoses that the alternative functional part is normal, the actuator control unit performs a second control process by use of a second output value from the alternative functional part to drive-control the actuator,
wherein when the main function diagnosis part diagnoses that the main functional part has the failure and the alternative function diagnosis part diagnoses that the alternative functional part has the failure, the actuator control unit outputs a failure detection signal to stop the first control process or the second control process that is being performed,
wherein the main function diagnosis part is configured to capable of diagnosing the main functional part in an operation guaranteed range wider than an operation guaranteed range of the main functional part,
wherein the main function diagnosis part determines whether or not the physical value is a value in a failure detection range based on a failure detection threshold value that is a threshold value for determining whether or not the physical value used in a failure diagnosis target is a value within the predetermined failure detection range and based on the physical value, diagnoses that the diagnosis target has the failure when it is determined that the value falls within the failure detection range, and diagnoses that the diagnosis target is normal when it is determined that the value is outside the failure detection range,
wherein the main function diagnosis part determines whether or not the physical value is an abnormal value based on an abnormality determination threshold value that is a threshold value for determining whether or not the physical value is the abnormal value and based on the physical value, the abnormality determination threshold value falling within a failure detection margin that is in a predetermined numerical value range between a predetermined normal value range for the physical value and the failure detection threshold value for suppressing an error in detection of the failure,
wherein the in-vehicle electronic control apparatus further comprises an abnormal behavior reducing part configured to reduce an abnormal behavior of the operation mechanism generated by the abnormal value when it is determined that the physical value is the abnormal value based on a determination result of the main function diagnosis part,
wherein the abnormal behavior reducing part corrects an output value of the failure diagnosis target to reduce the abnormal behavior, wherein the actuator control unit includes a processor, at least one of the first function and the second function is a phase characteristic function that is a function having a phase advance characteristic or a phase delay characteristic in which a sampling frequency is determined by an operation clock signal of the processor, the physical value includes the operation clock signal, and the abnormal behavior reducing part corrects an output value of a functional part that has the phase characteristic function used in the actuator control unit to reduce the abnormal behavior, when it is determined that a frequency of the operation clock signal is an abnormal value, and wherein the failure detection threshold value corresponding to the frequency of the operation clock signal includes a failure detection lower limit threshold value that is a threshold value on a side where the frequency is decreased, the abnormality determination threshold value corresponding to the frequency of the operation clock signal includes an abnormality determination lower limit threshold value that is a threshold value on the side where the frequency is decreased, the main function diagnosis part determines whether or not the frequency is a value in the failure detection range based on the frequency and the failure detection lower limit threshold value with respect to the functional part that has the phase characteristic function of a phase advance characteristic, the main function diagnosis part determines whether or not the physical value is an abnormal value based on the frequency and the abnormality determination lower limit threshold value with respect to the functional part that has the phase characteristic function of the phase advance characteristic, and the abnormality behavior reducing part performs a correction of reducing an output value of the functional part that has the phase characteristic function of the phase advance characteristic used in the actuator control unit by a predetermined value with respect to the functional part that has the phase characteristic function of the phase advance characteristic, when it is determined that the frequency of the operation clock signal is an abnormal value that exceeds the abnormality determination lower limit threshold value on the side where the frequency is decreased.

2. The in-vehicle electronic control apparatus according to claim 1, wherein
the abnormal behavior reducing part performs any one of a limit process of limiting a maximum value with respect to a correction target value, a gain correction process of multiplying the correction target value by a gain and an offset correction process of adding an offset value to the correction target value to reduce the abnormal behavior.

3. The in-vehicle electronic control apparatus according to claim 1, wherein
the actuator is an electric motor, the actuator control unit includes a processor, and an A/D converter configured to convert an analog input value into a digital value to input the converted digital value to the processor, the in-vehicle electronic control apparatus further comprises a position detection sensor configured to detect a rotation position of a rotator that forms the electric motor, the main functional part has a function, as the first function, of calculating on the processor a rotation angle of the electric motor based on a rotation position detected by the position detection sensor, which is the physical value, and the alternative functional part a function, as the second function, of estimating on the processor a rotation angle of the electric motor based on a motor terminal voltage and a motor current voltage of the electric motor, which are the physical value.

4. An in-vehicle electronic control apparatus comprising:
an actuator configured to generate a drive force to be given to an operation mechanism of an in-vehicle apparatus;
an actuator control unit configured to drive-control the actuator;
a main functional part having a first function that is a function relating to the drive-control of the actuator;
an alternative functional part having a second function that is an alternative function of the first function;
a main function diagnosis part configured to diagnose a normality or a failure of the main functional part; and
an alternative function diagnosis part configured to diagnose the normality or the failure of the alternative functional part,
wherein when the main function diagnosis part diagnoses that the main functional part is normal, the actuator control unit performs a first control process by use of a first output value from the main functional part to drive-control the actuator,
wherein when the main function diagnosis part diagnoses that the main functional part has the failure and the alternative function diagnosis part diagnoses that the alternative functional part is normal, the actuator control unit performs a second control process by use of a second output value from the alternative functional part to drive-control the actuator,
wherein when the main function diagnosis part diagnoses that the main functional part has the failure and the alternative function diagnosis part diagnoses that the alternative functional part has the failure, the actuator control unit outputs a failure detection signal to stop the first control process or the second control process that is being performed,
wherein the main function diagnosis part is configured to be capable of diagnosing the main functional part in an operation guaranteed range wider than an operation guaranteed range of the main functional part,
wherein the main function diagnosis part determines whether or not the physical value is a value in a failure detection range based on a failure detection threshold value that is a threshold value for determining whether or not the physical value used in a failure diagnosis target is a value within the predetermined failure detection range and based on the physical value, diagnoses that the diagnosis target has the failure when it is determined that the value falls within the failure detection range, and diagnoses that the diagnosis target is normal when it is determined that the value is outside the failure detection range,
wherein the main function diagnosis part determines whether or not the physical value is an abnormal value based on an abnormality determination threshold value that is a threshold value for determining whether or not the physical value is the abnormal value and based on the physical value, the abnormality determination threshold value falling within a failure detection margin that is in a predetermined numerical value range between a predetermined normal value range for the physical value and the failure detection threshold value for suppressing an error in detection of the failure,
wherein the in-vehicle electronic control apparatus further comprises an abnormal behavior reducing part configured to reduce an abnormal behavior of the operation mechanism generated by the abnormal value when it is determined that the physical value is the abnormal value based on a determination result of the main function diagnosis part, wherein the abnormal behavior reducing part corrects an output value of the failure diagnosis target to reduce the abnormal behavior, wherein the actuator control unit includes a processor, at least one of the first function and the second function is a phase characteristic function that is a function having a phase advance characteristic or a phase delay characteristic in which a sampling frequency is determined by an operation clock signal of the processor, the physical value includes the operation clock signal, and the abnormal behavior reducing part corrects an output value of a functional part that has the phase characteristic function used in the actuator control unit to reduce the abnormal behavior, when it is determined that a frequency of the operation clock signal is an abnormal value, and wherein the failure detection threshold value corresponding to the frequency of the operation clock signal includes a failure detection upper limit threshold value that is a threshold value on a side where the frequency is increased, the abnormality determination threshold value corresponding to the frequency of the operation clock signal includes an abnormality determination upper limit threshold value that is a threshold value on the side where the frequency is increased, the main function diagnosis part determines whether or not the frequency is a value in the failure detection range based on the frequency and the failure detection upper limit threshold value with respect to the functional part that has the phase characteristic function of a phase delay characteristic, the main function diagnosis part determines whether or not the frequency is an abnormal value based on the frequency and the abnormality determination upper limit threshold value with respect to the functional part that has the phase characteristic function of the phase delay characteristic, and the abnormality behavior reducing part performs a correction of increasing an output value of the functional part that has the phase characteristic function of the phase delay characteristic used in the actuator control unit by a predetermined value with respect to the functional part that has the phase characteristic function of the phase delay characteristic, when it is determined that the frequency is an abnormal value that exceeds the abnormality determination upper limit threshold value on the side where the frequency is increased.

5. The in-vehicle electronic control apparatus according to claim 4, wherein
the abnormal behavior reducing part performs any one of a limit process of limiting a maximum value with respect to a correction target value, a gain correction process of multiplying the correction target value by a gain and an offset correction process of adding an offset value to the correction target value to reduce the abnormal behavior.

6. The in-vehicle electronic control apparatus according to claim 4, wherein
the actuator is an electric motor, the actuator control unit includes a processor, and an A/D converter configured to convert an analog input value into a digital value to input the converted digital value to the processor, the in-vehicle electronic control apparatus further comprises a position detection sensor configured to detect a rotation position of a rotator that forms the electric motor, the main functional part has a function, as the first function, of calculating on the processor a rotation angle of the electric motor based on a rotation position detected by the position detection sensor, which is the physical value, and the alternative functional part a function, as the second function, of estimating on the processor a rotation angle of the electric motor based on a motor terminal voltage and a motor current voltage of the electric motor, which are the physical value.

* * * * *